(12) United States Patent
Kawaguchi

(10) Patent No.: US 11,082,639 B2
(45) Date of Patent: Aug. 3, 2021

(54) IMAGE DISPLAY METHOD, IMAGE DISPLAY SYSTEM, FLYING OBJECT, PROGRAM, AND RECORDING MEDIUM

(71) Applicant: SZ DJI TECHNOLOGY CO., LTD., Shenzhen (CN)

(72) Inventor: Takayoshi Kawaguchi, Tokyo (JP)

(73) Assignee: SZ DJI TECHNOLOGY CO., LTD., Shenzhen (CN)

( * ) Notice: Subject to any disclaimer, the term of this patent is extended or adjusted under 35 U.S.C. 154(b) by 0 days.

(21) Appl. No.: 16/539,324

(22) Filed: Aug. 13, 2019

(65) Prior Publication Data
US 2019/0373184 A1 Dec. 5, 2019

Related U.S. Application Data

(63) Continuation of application No. PCT/JP2017/005561, filed on Feb. 15, 2017.

(51) Int. Cl.
| | |
|---|---|
| *H04N 7/18* | (2006.01) |
| *H04N 5/272* | (2006.01) |
| *B64C 39/02* | (2006.01) |
| *B64D 47/08* | (2006.01) |

(52) U.S. Cl.
CPC ........... *H04N 5/272* (2013.01); *B64C 39/024* (2013.01); *B64D 47/08* (2013.01); *B64C 2201/027* (2013.01); *B64C 2201/123* (2013.01); *B64C 2201/146* (2013.01)

(58) Field of Classification Search
CPC ........................ B64C 2201/146; B64C 39/024
USPC ........................................................ 348/144
See application file for complete search history.

(56) References Cited

U.S. PATENT DOCUMENTS

| | | | |
|---|---|---|---|
| 5,878,356 A * | 3/1999 | Garrot, Jr. ............... | G01C 11/02 348/144 |
| 8,511,606 B1 * | 8/2013 | Lutke .................... | B64C 39/028 244/100 R |
| 8,521,339 B2 * | 8/2013 | Gariepy ................ | B64C 39/024 244/190 |
| 9,563,201 B1 | 2/2017 | Tofte et al. | |
| 9,665,094 B1 * | 5/2017 | Russell ................. | B64C 39/024 |
| 9,927,809 B1 * | 3/2018 | Tofte .................... | G05D 1/0038 |
| 10,678,238 B2 * | 6/2020 | Moeller ............... | G02B 27/017 |

(Continued)

FOREIGN PATENT DOCUMENTS

| | | |
|---|---|---|
| CN | 102788580 A | 11/2012 |
| CN | 104183015 A | 12/2014 |

(Continued)

OTHER PUBLICATIONS

The World Intellectual Property Organization (WIPO) International Search Report for PCT/JP2017/005561 dated May 9, 2017 5 pages.

*Primary Examiner* — Leron Beck
(74) *Attorney, Agent, or Firm* — Anova Law Group, PLLC

(57) ABSTRACT

An image display method includes acquiring an aerial image captured during flight of a flying object, acquiring a first image based on the aerial image, acquiring image position information of the flying object corresponding to an image position in a horizontal direction of the flying object in the first image, superimposing related information of the flying object at the image position in the first image to generate a second image, and displaying the second image.

20 Claims, 26 Drawing Sheets

(56) References Cited

U.S. PATENT DOCUMENTS

| | | | | |
|---|---|---|---|---|
| 2006/0083501 A1* | 4/2006 | Segal | ............... | A63H 27/12 |
| | | | | 396/7 |
| 2007/0025595 A1* | 2/2007 | Koizumi | ............ | G06K 9/0063 |
| | | | | 382/103 |
| 2012/0300070 A1* | 11/2012 | Ohtomo | ............... | G03B 35/02 |
| | | | | 348/144 |
| 2016/0327946 A1* | 11/2016 | Koga | ................. | G05D 1/0038 |
| 2017/0076612 A1* | 3/2017 | Takahashi | ............ | G08G 5/0069 |
| 2017/0205826 A1* | 7/2017 | Smith | ................. | B64C 39/024 |
| 2017/0355458 A1* | 12/2017 | Chen | ................. | G08G 5/0021 |
| 2018/0061247 A1* | 3/2018 | Brown | ............... | G08G 5/0013 |
| 2018/0265192 A1* | 9/2018 | Yamagami | ............ | B64C 39/022 |

FOREIGN PATENT DOCUMENTS

| | | | |
|---|---|---|---|
| CN | 105759833 | A | 7/2016 |
| JP | H1042282 | A | 2/1998 |
| JP | H1114354 | A | 1/1999 |
| JP | H11291991 | A | 10/1999 |
| JP | 2001197481 | A | 7/2001 |
| JP | 2003110981 | A | 4/2003 |
| JP | 2014089160 | A | 5/2014 |
| JP | 2016206443 | A | 12/2016 |
| WO | 2015029007 | A1 | 3/2015 |

* cited by examiner

IMAGE DISPLAY METHOD, IMAGE DISPLAY SYSTEM, FLYING OBJECT, PROGRAM, AND RECORDING MEDIUM

CROSS-REFERENCE TO RELATED APPLICATION

This application is a continuation application of International Application No. PCT/JP2017/005561, filed on Feb. 15, 2017, the entire content of which is incorporated herein by reference.

TECHNICAL FIELD

The present disclosure relates to an image display method and an image display system for displaying an image based on an aerial image captured by a flying object. The present disclosure further relates to a flying object for processing an aerial image. In addition, the present disclosure further relates to a program and a recording medium for processing an aerial image captured by a flying object.

BACKGROUND

In conventional technology, a system may be used to display the location of a person, a vehicle, an Unmanned Aerial Vehicle (UAV), and the like on a pre-prepared image of a map. In addition, in conventional technology, an aerial image distribution system may be used to display an aerial image and an image in which the location of a UAV and the location of a ground station may be superimposed on a map image, and reference may be made to the Patent Prior Art provided below. Further, the aerial image distribution system may superimpose the location coordinates of the UAV on the map image.

REFERENCE

Patent document: Japanese Application Publication JP 2016-0206443.

SUMMARY

When the UAV is operated through the operating device (e.g., a transmitter), the operator of the operating device may display the aerial image on the display screen and check the aerial image displayed on the display screen while performing the flight operation. Based on the conventional technology, in the aerial image distribution system, the position of the UAV may not be superimposed on the aerial image. Therefore, it may be difficult to identify the flight position of the UAV based on the aerial image. Further, it may be difficult for the operator of the operating device to fly the UAV to a desired position while checking the aerial image through the operating device.

In addition, in the aerial image distribution system in the conventional technology, a map image may need to be pre-prepared. The position of the UAV may be displayed on the pre-prepared map image, but the aerial image captured by the UAV in real time may not display the flight position of the UAV. Therefore, if the pre-prepared map image is not checked, it may be difficult to identify the flight position of the UAV.

In accordance with the disclosure, there is provided an image display method including acquiring an aerial image captured during flight of a flying object, acquiring a first image based on the aerial image, acquiring image position information of the flying object corresponding to an image position in a horizontal direction of the flying object in the first image, superimposing related information of the flying object at the image position in the first image to generate a second image, and displaying the second image.

Also in accordance with the disclosure, there is provided an image display system including a processor and a memory storing a computer program that, when executed by the processor, causes the processor to acquire an aerial image captured during flight of a flying object, acquire a first image based on the aerial image, acquire image position information of the flying object corresponding to an image position in a horizontal direction of the flying object in the first image, superimpose related information of the flying object at the image position in the first image to generate a second image, and control display of the second image.

DETAILED DESCRIPTION OF THE EMBODIMENTS

Figure 1:
FIG. 1 is a diagram illustrating an example configuration of a flight system according to an embodiment of the present disclosure.
Figure 1:
Figure 1:
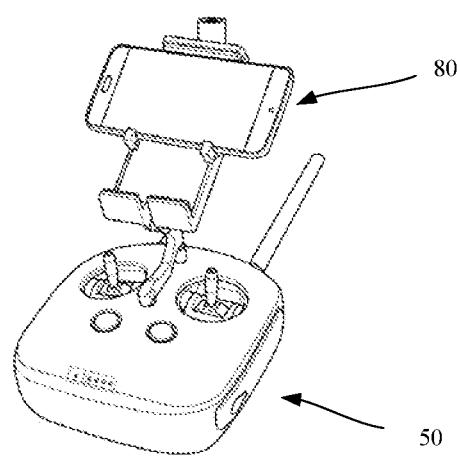

The technical solutions provided in the embodiments of the present disclosure will be described below with reference to the drawings. However, it should be understood that the following embodiments do not limit the disclosure. It will be appreciated that the described embodiments are some rather than all of the embodiments of the present disclosure. Other embodiments conceived by those having ordinary skills in the art on the basis of the described embodiments without inventive efforts should fall within the scope of the present disclosure. In the situation where the technical solutions described in the embodiments are not conflicting, they can be combined. It should be noted that technical solutions provided in the present disclosure do not require all combinations of the features described in the embodiments of the present disclosure.

Consistent with the disclosure, a flying object may include an aircraft that can move in the air. In the following embodiments, an unmanned aerial vehicle (UAV) is described as an example of the flying object. In the drawings of the present disclosure, an unmanned aerial vehicle is labeled as "UAV." In addition, a flight system is described as an example of an image display system, and the described image display method may be implemented in the image display system. Further, a program, e.g., a program that may cause the flight system to perform various processes, may be recorded on a recording medium, such as a non-transitory computer-readable storage medium.

FIG. 1 is a diagram illustrating an example configuration of a flight system 10 consistent with embodiments of the present disclosure. The flight system 10 includes a UAV 100, a transmitter 50, and a portable terminal 80. The UAV 10, the transmitter 50, and the portable terminal 80 may communicate with each other through a wired communication or a wireless communication (e.g. a wireless Local Area Network (LAN)).

Figure 2:
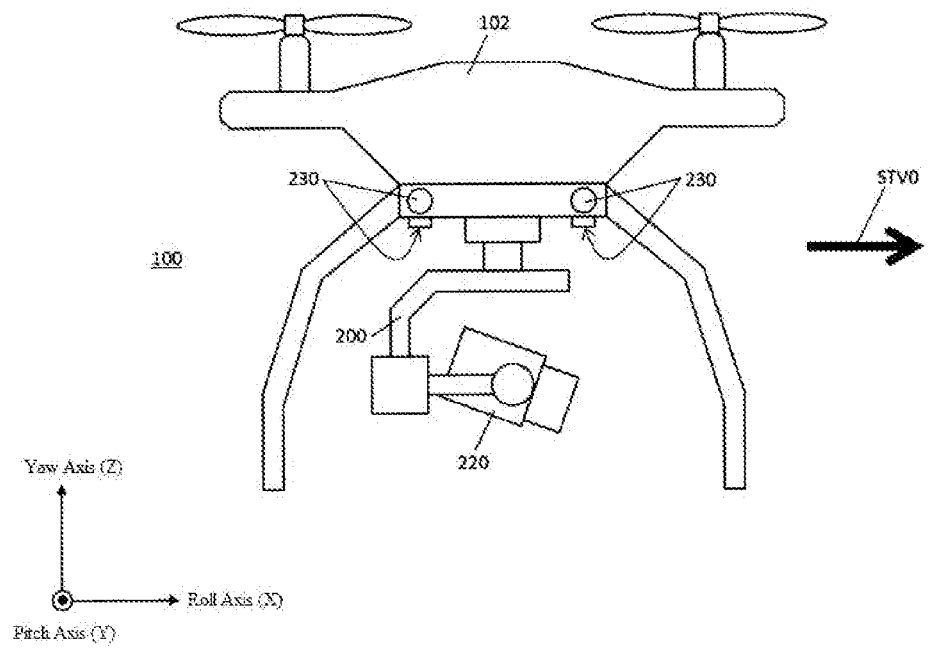
FIG. 2 is a diagram illustrating an example of the appearance of a UAV.
Figure 3:
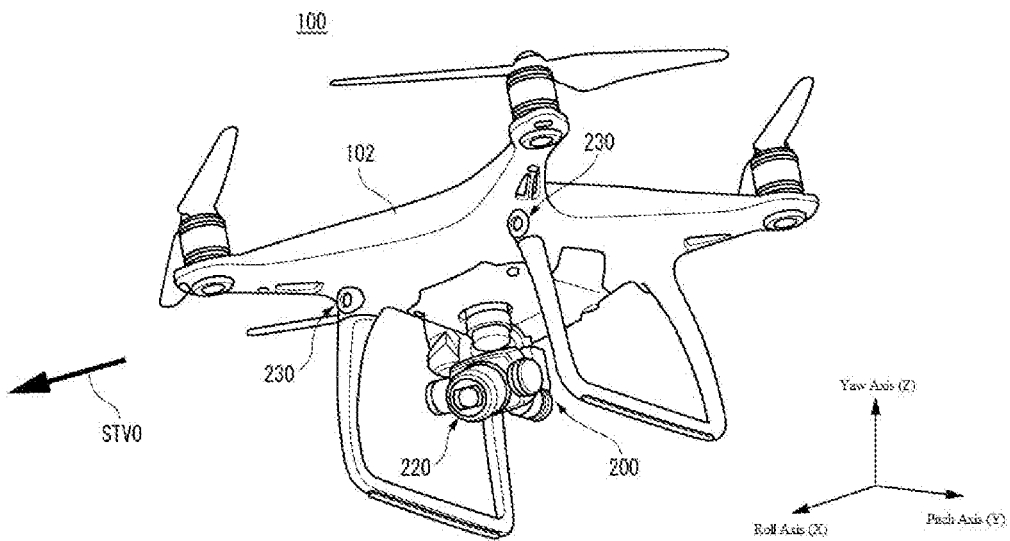
FIG. 3 is a diagram illustrating an example of a specific appearance of the UAV.

The example configuration of the UAV 100 will be described below. FIG. 2 is a diagram illustrating an example of the appearance of the UAV 100 and FIG. 3 is a diagram illustrating an example of a specific appearance of the UAV 100. For example, FIG. 2 may be a side view illustrating the UAV 100 flying in the moving direction STV0, and FIG. 3 may be a perspective view illustrating the UAV 100 flying in the moving direction STV0.

As shown in FIG. 2 and FIG. 3, the roll axis (e.g., the x-axis) may be defined as a direction parallel to the ground and along the moving direction STV0. The pitch axis (e.g., the y-axis) may be determined to be a direction parallel to the ground and perpendicular to the roll axis. Further, the yaw axis (e.g., the z-axis) may be determined to be a direction perpendicular to the ground and perpendicular to the roll axis and the pitch axis.

Figure 10A:
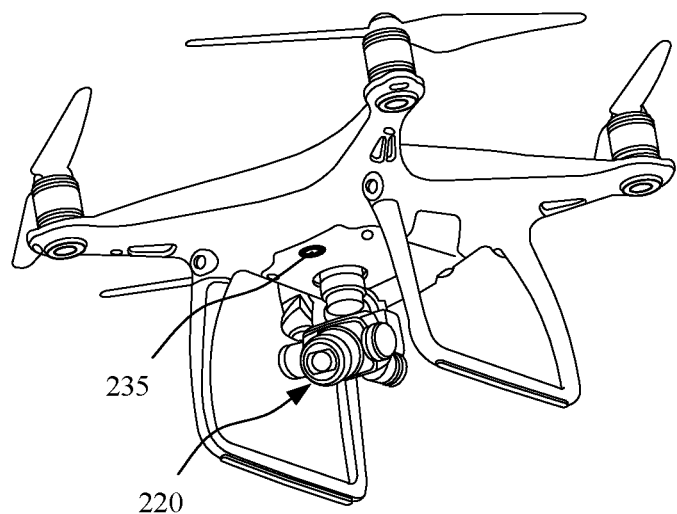
FIG. 10A is a perspective view illustrating an example setting of an imaging device as an operation camera.
Figure 10B:
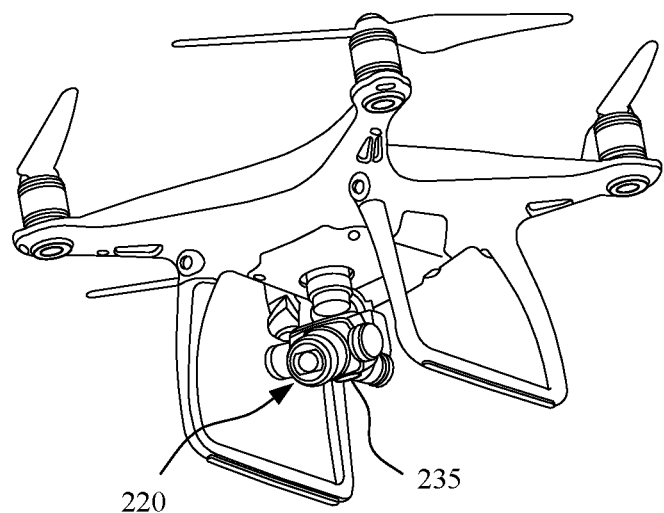
FIG. 10B is a perspective view illustrating another example setting of the imaging device as an operation camera.

As shown in FIG. 3, the UAV 100 includes a UAV body 102, a gimbal 200, an imaging device 220, and a plurality of imaging devices 230. In some embodiments, as shown in FIGS. 10A and 10B, the UAV 100 includes an imaging device 235. In some embodiments, the UAV body 102 may be an example of a housing of the UAV 100; the imaging devices 220, 230, and 235 may be an example of an imaging unit; and the gimbal 200 may be an example of a support member.

The UAV body 102 may include a plurality of rotors (e.g., propellers), and the UAV body 102 may facilitate the UAV 100 to fly by controlling the rotation of the plurality of rotors. In some embodiments, the UAV body 102 may facilitate the UAV 100 to fly by using, for example, 4 rotors, however, the number of the rotors is not limited to 4. In addition, the UAV 100 may also be a fixed-wing aircraft with the rotors.

The imaging device 220 may be a photographing camera that may be used to photograph an object (e.g., the scene above the object of the aerial image, scenery of mountains, rivers, etc., and buildings on the ground) included in a desired imaging range.

The plurality of imaging device 230 may be sensing cameras for capturing the surrounding images of the UAV 100 for controlling the flight of the UAV 100. In some embodiments, two imaging devices 230 may be disposed at the nose (i.e., the front side) of the UAV 100, and/or two imaging devices 230 may be disposed on the bottom surface of the UAV 100. The two imaging devices 230 on the front side may be paired to function as a so-called stereo camera. The two imaging devices 230 on the bottom surface side may be paired to function as a stereo camera. As such, the three-dimensional spatial data around the UAV 100 may be generated based on the images captured by the plurality of image devices 230. In addition, the number of imaging devices 230 included in the UAV 100 may not be limited to 4. For example, the UAV 100 may include at least one imaging device 230. In another example, the UAV 100 may include at least one imaging device 230 at the nose, at least one imaging device 230 at the tail, at least one imaging device 230 at each side surface, at least one imaging device 230 at the bottom surface, and at least one imaging device 230 at the top surface of the UAV 100, respectively. The viewing angle that may be set in the imaging devices 230 may be larger than the viewing angle that may be set in the imaging device 220. In some embodiments, the imaging devices 230 may include a single focus lens or a fisheye lens.

Figure 4:
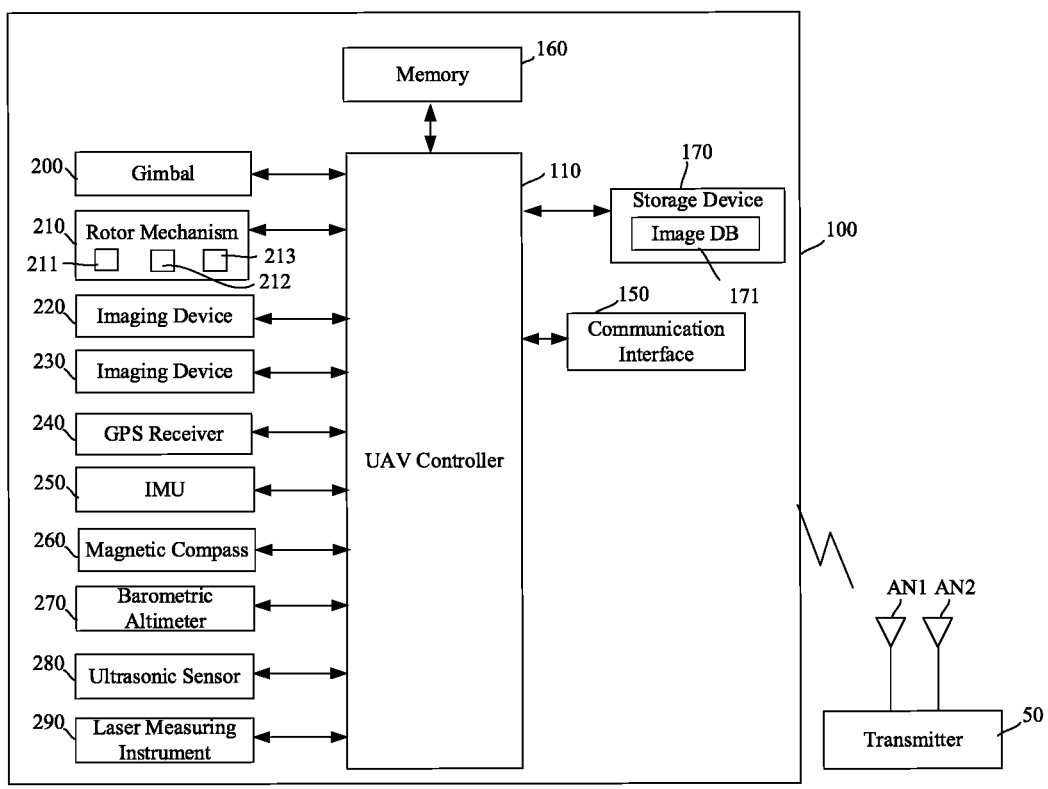
FIG. 4 is a block diagram illustrating an example hardware configuration of the UAV according to an embodiment of the present disclosure.

FIG. 4 is a block diagram illustrating an example hardware configuration of a UAV consistent with embodiments of the present disclosure. The UAV 100 may be configured to include a UAV controller 110, a communication interface 150, a memory 160, a storage device 170, a gimbal 200, a rotor mechanism 210, an imaging device 220, an imaging device 230, a GPS receiver 240, an Inertial Measurement Unit (IMU) 250, a magnetic compass 260, a barometric altimeter 270, an ultrasonic sensor 280, and a laser measuring instrument 290. In some embodiments, the communication interface 150 may be an example of an output unit.

The UAV controller 110 may include, for example, a Central Processing Unit (CPU), a Micro Processing Unit (MPU), or a Digital Signal Processor (DSP). The UAV controller 110 may be configured to perform the signal processing for the overall controlling of the actions of the respective parts of the UAV 100, the input/output processing of data between the various respective parts, the arithmetic processing of the data, and the storage processing of the data.

The UAV controller 110 may be used to control the flight of the UAV 100 based on a program stored in the memory 160. The UAV controller 110 may be used to control the flight of the UAV 100 based on an instruction received from the remote transmitter 50 through the communication interface 150. In some embodiments, the memory 160 may be detached from the UAV 100.

The UAV controller 110 may specify the environment around the UAV 100 by analyzing a plurality of images captured by the plurality of images devices 230. In some embodiments, the UAV controller 110 may control the flight, such as avoiding an obstacle, based on the environment around the UAV 100.

The UAV controller 110 may be configured to acquire date and time information indicating the current date and time. In some embodiments, the UAV controller 110 may be configured to acquire the date and time information indicating the current date and time from the GPS receiver 240. In addition, the UAV controller 110 may be configured to acquire the data and time information indicating the current date and time from a timer (not shown) mounted on the UAV 100.

The UAV controller 110 may be configured to acquire position information indicating the position of the UAV 100. In some embodiments, the UAV controller 110 may be configured to acquire the position information indicating the latitude, longitude, and altitude at which the UAV 100 may be located from the GPS receiver 240. More specifically, the UAV controller 110 may be configured to acquire the latitude and longitude information indicating the latitude and longitude of the UAV 100 from the GPS receiver 240, and acquire the height information indicating the height of the UAV 100 from the barometric altimeter 270, respectively as the position information. In some embodiments, the UAV controller 110 may be configured to acquire the distance between the ultrasonic radiation point generated by the ultrasonic sensor 280 and the ultrasonic reflection point as the height information.

The UAV controller 110 may be configured to acquire orientation information indicating the orientation of the UAV 110 from the magnetic compass 260. The orientation information may indicate, for example, an orientation corresponding to the orientation of the nose of the UAV 100.

The UAV controller 110 may be configured to acquire the position information indicating a position where the UAV 110 should be at when the imaging device 220 captures an imaging range that is to be captured. In some embodiments, the UAV controller 110 may be configured to acquire the position information indicating the position where the UAV should be at from the memory 160. In addition, the UAV controller 110 may be configured to acquire the position information indicating the position where the UAV 100 should be at from the other devices such as the transmitter 50 via the communication interface 150. In order to capture the imaging range to be captured, the UAV controller 110 may specify the position where the UAV 100 should be at with reference to a three-dimensional map database, and acquired the position as the position information indicating the position where the UAV 100 should be at.

The UAV controller 110 may be configured to acquire imaging information indicating an imaging range of each of the imaging device 220 and the imaging device 230. The UAV controller 110 may be configured to acquire viewing angle information indicating the viewing angles of the imaging device 220 and the imaging device 230 from the imaging device 220 and the imaging device 230 as the parameters for specifying the imaging range. In some embodiments, the UAV controller 110 may be configured to acquire information indicating the photographing directions of the imaging device 220 and the imaging device 230 as the parameters for specifying the imaging range. The UAV controller 110 may be configured to acquire attitude information indicating the attitude state of the imaging device 220 from the gimbal 200, such as the information indicating the photographing direction of the imaging device 220. The UAV controller 110 may be configured to acquire information indicating the orientation of the UAV 100. The information indicating the attitude state of the imaging device 220 may indicate the angle at which the gimbal 200 may be rotated from the reference rotation angles of the pitch axis and the yaw axis. The UAV controller 110 may be configured to acquire the position information indicating the position of the UAV 100 as a parameter for specifying the imaging range. In some embodiments, the UAV controller 110 may be configured to acquire the imaging information by specifying the imaging range indicating the geographical range captured by the imaging device 220 and generating the imaging information indicating the imaging range based on the viewing angle and the photographing direction of the imaging device 220 and the imaging device 230, and the position of the UAV 100.

The UAV controller 110 may be configured to acquire imaging information indicating the imaging range that the imaging device 220 should capture. The UAV controller 110 may be configured to acquire the imaging information that the imaging device 220 should capture from the memory 160. Alternatively, the UAV controller 110 may be configured to acquire the imaging information that the imaging device 220 should capture from the other devices such as the transmitter 50 via the communication interface 150.

The UAV controller 110 may be configured to acquire stereoscopic information (e.g., three-dimensional information) indicating a three-dimensional shape of an object in the surroundings of the UAV 100. The object may be a part of a landscape such as a building, a road, a vehicle, or a tree. The stereoscopic information may be, for example, three-dimensional spatial data. The UAV controller 110 may be configured to generate the stereoscopic information indicating a three-dimensional shape of an object in the surroundings of the UAV 100 based on each image obtained by the plurality of imaging devices 230, thereby acquiring the stereoscopic information. In some embodiments, the UAV controller 110 may be configured to acquire the stereoscopic information indicating a three-dimensional shape of an object in the surroundings of the UAV 100 by referring to a three-dimensional map database stored in the memory 160. In some embodiments, the UAV controller 110 may be configured to acquire the stereoscopic information indicating a three-dimensional shape of an object in the surroundings of the UAV 100 by referring to a three-dimensional map database managed by a server in a network.

The UAV controller 110 may be configured to acquire imaging data acquired by the imaging device 220 and the imaging device 230.

The UAV controller 110 may be used to control the gimbal 200, the rotor mechanism 210, the imaging device 220, and the imaging device 230. The UAV controller 110 may be used to control the imaging range of the imaging device 220 by changing the photographing direction or the viewing angle of the imaging device 220. In some embodiments, the UAV controller 110 may be used to control the imaging range of the imaging device 220 supported by the gimbal 220 by controlling the rotation mechanical of the gimbal 200.

In the present disclosure, the imaging range may refer to a geographical range that can be captured by the imaging device 220 or the imaging device 230. The imaging range may be defined by latitude, longitude, and altitude. In some embodiments, the imaging range may be a range of three-dimensional spatial data defined by latitude, longitude, and altitude. In some embodiments, the imaging range may be specified based on the viewing angle and the photographing direction of the imaging device 220 or the imaging device 230, and the position of the UAV 110. The photographing direction of the imaging device 220 and the imaging device 230 may be defined by the orientation and the depression angle of the imaging device 220 and the imaging device 230 including an imaging lens disposed on the front surface. In some embodiments, the photographing direction of the imaging device 220 may be a direction specified by the nose direction of the UAV 100 and the attitude data of the imaging device 220 of the gimbal 200. In some embodiments, the photographing direction of the imaging device 230 may be a direction specified by the nose direction of the UAV 100 and the position where the imaging device 230 may be provided.

The UAV controller 110 may be used to control the flight of the UAV 100 by controlling the rotor mechanism 210. For example, the UAV controller 100 may be used to control the position including the latitude, longitude, and altitude of the UAV 100 by controlling the rotor mechanism 210. The UAV controller 110 may be used to control the imaging ranges of the imaging device 220 and the imaging device 230 by controlling the flight of the UAV 100. In addition, the UAV controller 110 may be used to control the viewing angle of the imaging device 220 by controlling the zoom lens included in the imaging device 220. In some embodiments, the UAV controller 210 may be used to control the viewing angle of the imaging device 220 through digital zooming by using the digital zooming function of the imaging device 220.

When the imaging device 220 is fixed to the UAV 100 and the imaging device 220 is not moving, the UAV controller 110 may cause the imaging device 220 to capture a desired imaging range in a desired environment by moving the UAV 100 to a specific position on a specific date. Alternatively, when the imaging device 220 does not include the zoom function and the viewing angle of the imaging device 220 cannot be changed, the UAV controller 110 may cause the imaging device 220 to capture a desired imaging range in a desired environment by moving the UAV 100 to a specific position on a specific date.

The communication interface 150 may be in communication with the transmitter 50. The communication interface 150 may receive various instructions and information from the remote transmitter 50 for the UAV controller 110.

The memory may store the programs and the like needed for the UAV controller 110 to control the gimbal 200, the rotor mechanism 210, the imaging device 220, the imaging device 230, the GPS receiver 240, the IMU 250, the magnetic compass 260, the barometric altimeter 270, the ultrasonic sensor 280, and the laser measuring instrument 290. The memory may be a computer readable recording medium, which may include at least one of a Static Random Access Memory (SRAM), a Dynamic Random Access Memory (DRAM), an Erasable Programmable Read Only Memory (EPROM), an Electrically Erasable Programmable Read-Only Memory (EEPROM), and a flash memory such as a USB memory. The memory 160 may be disposed include the UAV body 102, and it may be configured to be detachable from the UAV body 102.

The storage device 170 may be used to save and store various data and information. In some embodiments, the storage device 170 may include an image Data Base (image DB) 171. The storage device 170 may be a Hard Disk Drive (HDD), a Solid State Drive (SSD), a SD card, a USB storage device, etc. The storage device 170 may be disposed include the UAV body 102, and it may be configured to be detachable from the UAV body 102.

The image DB 171 may save and store the aerial images captured by the imaging device 220 and the imaging device 235. The image DB 171 may transmit a part of the stored aerial images to the UAV controller 110 based on a request from the UAV controller 110. In some embodiments, the image DB 171 may save and store the processed images of the processed aerial images. In some embodiments, the image DB 171 may save and store the aerial images or the processed images based on a state in which the related information may be added to the aerial images or the processed images.

The gimbal 200 may rotatably support the imaging device 220 centered on one or more axes. For example, the gimbal 200 may rotatably support the imaging device 220 centered on the yaw axis, the pitch axis, and the roll axis. In some embodiments, the gimbal 200 may change the photographing direction of the imaging device 220 by rotating the imaging device 220 around one or more of the yaw axis, the pitch axis, and the roll axis.

The rotor mechanism 210 may include a plurality of rotors 211, a plurality of driving motors 212 for rotating the plurality of rotors 211, and a current sensor 213 for measuring a current value (e.g., an actual measurement value) of a drive current for driving the driving motors 212. In some embodiments, the drive current may be supplied to the driving motors 212.

The imaging device 220 may be used to capture an image of an object in the desired imaging range and generates data of the captured image. The image data obtained through the imaging of the imaging device 220 may be stored in a memory of the imaging device or in the memory 160.

The imaging device 230 may be used to capture the surroundings of the UAV 100 and generate data of the captured image. The image data of the imaging device 230 may be stored in the memory 160.

The imaging device 235 may be used to capture the surroundings of the UAV 100 (e.g., the ground direction) and generate data of the captured image. The image data of the imaging device 235 may be stored in the memory 160.

The GPS receiver 240 may be configured to receive a plurality of signals transmitted from a plurality of navigation satellites (e.g., GPS satellites) indicating time and position (e.g., coordinates) of each GPS satellite. Further, the GPS receiver 240 may be configured to calculate the position (e.g., the position of the UAV 100) of the GPS receiver 240 based on plurality of received signals. Furthermore, the GPS receiver 240 may be configured to output the position information of the UAV 100 to the UAV controller 110. In some embodiments, the calculation of the position information of the GPS receiver 240 may be performed by the UAV controller 110 instead of the GPS receiver 240. As such, the UAV controller 110 may input the information indicating the time and the position of each GPS satellite included in the plurality of signals received by the GPS receiver 240.

The IMU 250 may be configured to detect the attitude of the UAV 100 and output the detection result to the UAV controller 110. In some embodiments, the IMU 250 may be configured to detect the front, rear, left, right, upward, and downward accelerations of the three-axis of the UAV 100 and the angular velocities in the three-axis directions of the pitch axis, the roll axis, and the yaw axis as the attitude of the UAC 100.

The magnetic compass 260 may be configured to detect the orientation of the nose of the UAV 100 and output the detection result to the UAV controller 110.

The barometric altimeter 270 may be configured to detect the flying height of the UAV 100 and output the detection result the UAV controller 110.

The ultrasonic sensor 280 may be configured to emit ultrasonic waves, detect the ultrasonic waves reflected from the ground and the objects, and output the detection result to the UAV controller 110. The detection result may indicate the distance from the UAV 100 to the ground, that is, the altitude. In some embodiments, the detection result may indicate the distance from the UAV 100 to the object.

Figure 5:
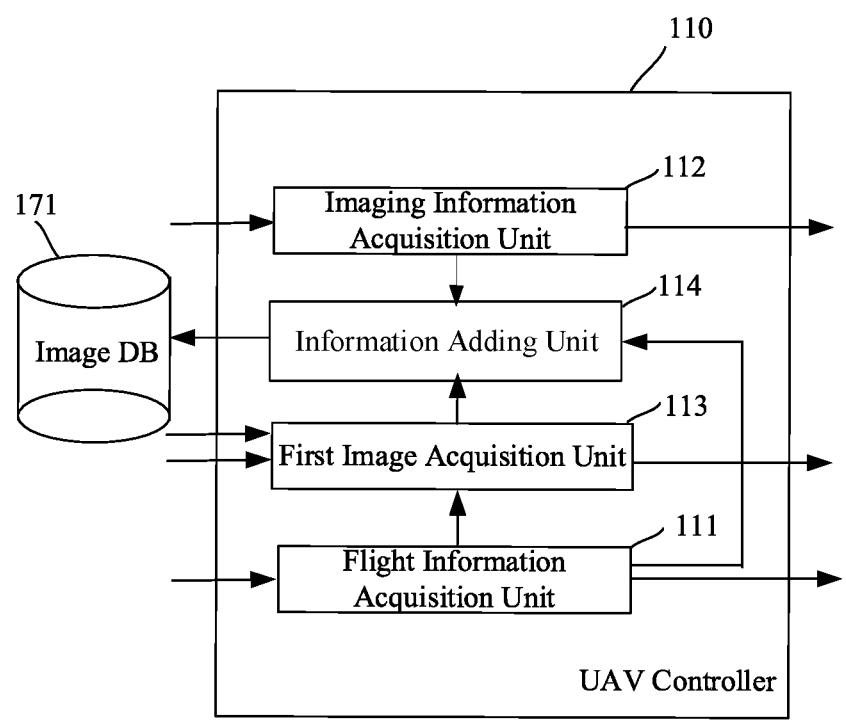
FIG. 5 is a block diagram illustrating an example functional configuration of the UAV according to an embodiment of the present disclosure.

The laser measuring instrument 290 may be configured to irradiate a laser light onto the object, receive the reflected light reflected by the object, and measure the distance between the UAV 100 and the object based on the reflected light. As an example, the time-of-flight method may be a laser-based distance measuring method, FIG. 5 is a block diagram illustrating an example functional configuration of the UAV 100 consistent with embodiments of the present disclosure. As shown in FIG. 5, the UAV controller 110 includes a flight information acquisition unit 111, an imaging information acquisition unit 112, a first image acquisition unit 113, and an information adding unit 114.

In particular, the flight information acquisition unit 111 may be an example of a third acquisition unit, a fifth acquisition unit, or an eighth acquisition unit. The imaging information acquisition unit 112 may be an example of a fourth acquisition unit, a sixth acquisition unit, or a seventh acquisition unit. The first image acquisition unit 113 may be an example of the first acquisition unit. The information adding unit 114 may be an example of an adding unit.

The flight information acquisition unit 111 may be configured to acquire information related to the flight of the UAV 100, and the information related to the flight of the UAV 100 may include flight position information of the UAV 100, orientation information of the UAV 100, and flight direction information of the UAV 100.

The flight information acquisition unit 111 may be configured to acquire the position information of the UAV 100, that is, the information of the flight position. The flight information acquisition unit 111 may acquire the position information (e.g., latitude/longitude information, or latitude/longitude/height information) from the GPS receiver 240. Alternatively, the flight information acquisition unit 111 may acquire the position information that is not obtained through the GPS receiver 240. In some embodiments, the flight information acquisition unit 111 may acquire the position information of the UAV 100 by calculation based on the position information of an arbitrary reference position and the relative position information with respect to the reference position.

The flight information acquisition unit 111 may be configured to acquire the orientation information of the UAV 100. The orientation of the UAV 100 may coincide with the flight direction when the UAV 100 is moving forward. In some embodiments, the orientation of the UAV 100 may be defined based on the direction of the arrangement position of a reference component in the UAV 100. In some embodiments, the orientation of the UAV 100 may be obtained through the magnetic compass 260.

The flight information acquisition unit 111 may be configured to acquire the flight direction information of the UAV 100. The flight information acquisition unit 111 may acquire the flight direction information of the UAV 100 based on the temporal change (e.g., time differentiation) of the position information of the UAV 100. More specifically, the flight information acquisition unit 111 may set the direction in which the speed indicated by the time change may be greater than or equal to 1 as the flight direction. In some embodiments, the flight information acquisition unit 111 may acquire the flight direction information of the UAV 100 based on the speed information of the UAV 100. Further, the flight information acquisition unit 111 may acquire the flight direction information of the UAV 100 based on the time integral of the acceleration of the UAV 100.

In one embodiment, a portion of the information related to the flight of the UAV may be transmitted to the portable terminal 80 through the communication interface 150.

The imaging information acquisition unit 112 may be configured to acquire information related to the imaging by the imaging device 220 and the image device 235. The imaging-related information of the imaging device 220 and the image device 235 may include the photographing direction information of the image devices 220 and 235, the inclination information of the image devices 220 and 235, and the viewing angle information of the image devices 220 and 235.

The imaging information acquisition unit 112 may be configured to acquire photographing direction information of the image devices 220 and 235. The imaging information acquisition unit 112 may calculate the photographing direction information of the image device 220 based on the orientation information of the UAV 100 and the attitude information indicating the attitude state of the imaging device 220 with respect to the UAV 100 acquired from the gimbal 220. Further, the imaging information acquisition unit 112 may calculate the photographing direction information of the image device 235 based on the orientation information of the UAV 100 and the attitude information indicating the attitude state of the imaging device 235 with respect to the UAV 100.

In one embodiment, when the imaging device 235 is fixedly disposed in the UAV body 102, the attitude information of the imaging device 235 with respect to the UAV 100 may be known information, which may be stored in a memory in the imaging device 235 or the memory 160. In one embodiment, when the imaging device is disposed on the gimbal 200, the attitude information of the imaging device 235 with respect to the UAV 100 may be acquired from the gimbal 200.

The imaging information acquisition unit 112 may be configured to acquire the inclination information of the imaging devices 220 and 235 with respect to the direction of gravity. The inclination of the imaging device 220 with respect to the direction of gravity may be obtained by calculation or the like based on the inclination of the UAV 100 with respect to the direction of gravity (i.e., the attitude information of the UAV 100 from the IMU 250) and the inclination of the imaging device 220 with respect to the UAV 100 (i.e., the attitude information of the imaging device 220 from the gimbal 200). The inclination of the imaging device 235 with respect to the direction of gravity may be obtained by calculation or the like based on the inclination of the UAV 100 with respect to the direction of gravity and the inclination of the imaging device 235 with respect to the UAV 100 (the inclination may be known due to the fixed arrangement).

In one embodiment, when the imaging device 235 is fixedly disposed in the UAV body 102, the inclination information of the imaging device 235 with respect to the UAV 100 may be known information, which may be stored in a memory in the imaging device 235 or the memory 160. In one embodiment, when the imaging device is disposed on the gimbal 200, the inclination information of the imaging device 235 with respect to the UAV 100 may be acquired from the gimbal 200.

In one embodiment, the imaging information acquisition unit 112 may be configured to acquire the viewing angle information of the imaging devices 220 and 235 from the imaging devices 220 and 235.

In one embodiment, a portion of the imaging-related information of the imaging devices 220 and 235 may be transmitted to the portable terminal 80 through the communication interface 150.

The first image acquisition unit 113 may be configured to acquire an aerial image captured by the imaging devices 220 and 235. In some embodiments, the first image acquisition unit 113 may generate a downward-facing image based on the aerial image, where the downward-facing image may be an example of the first image. The downward-facing image may include an image position corresponding to the horizontal position of the UAV 100 when the aerial image is captured within the relevant imaging range. In some embodiments, the downward-facing image may be the aerial image when the imaging range of the aerial image includes the image position corresponding to the horizontal position of the UAV 100 when the image is captured. Further, the first image acquisition unit 113 may generate a downward-facing image based on the aerial image when the imaging range of the aerial image does not include the image position corresponding to the horizontal direction of the UAV 100 when the image is captured.

In one embodiment, the first image acquisition unit 113 may be configured to perform a projective transformation on the aerial image captured by the imaging devices 220 and 235 to generate the downward-facing image based on the inclination of the imaging devices 220 and 235. For example, when the photographing direction of the imaging devices 220 and 235 is inclined with respect to the direction of gravity with respect to the normal direction of the aerial image while perform the aerial imaging, the first image acquisition unit 113 may perform the projective transformation of the normal direction toward the direction of gravity to generate the downward-facing image. In some embodiments, the downward-facing image may be an image in which the direction of gravity may be the normal direction. The projective transformation is an example of a linear transformation, and other linear transformations may also be performed.

The first image acquisition unit 113 may be configured to acquire any one of the aerial images stored in the image DB 171. In one embodiment, the first image acquisition unit 113 may perform the projective transformation to generate the downward-facing image based on the inclination of the imaging devices 220 and 235 when the aerial image is captured.

The first image acquisition unit 113 may be configured to acquire a specific aerial image stored in the aerial images in the image DB 171 based on the current position information of the UAV 100. In some embodiments, the first image acquisition unit 113 may be configured to acquire an aerial image including the added position information from image DB 171, and the position information may coincide with the position information indicating the position of the UAV 100 at the time of the aerial imaging. In some embodiments, the first image acquisition unit 113 may be configured to acquire an aerial image including the added position information from image DB 171, and even if the position information may not coincide with the position information indicating the position of the UAV 100 at the time of the aerial imaging, it may be the position information of a position closest to the position of the aerial imaging.

The first image acquisition unit 113 may be configured to acquire actual spatial range (e.g., latitude/longitude range) information corresponding to the imaging range of the aerial image captured by the imaging devices 220 and 235 by calculation or the like based on the inclination of the imaging devices 220 and 235 and the viewing angle of the imaging devices 220 and 235. In some embodiments, the first image acquisition unit 113 may be configured to acquire the actual spatial range information by calculation or the like in combination with the altitude information of the UAV 100 at the time of the aerial imaging. Further, the first image acquisition unit 113 may be configured to acquire an aerial image including the flight position indicated by the position information of the UAV 100 within the imaging range from the image DB 171.

The first image acquisition unit 113 may be configured to acquire a plurality of specific aerial images stored in the aerial images in the image DB 171 based on the current position information of the UAV 100. In some embodiments, the first image acquisition unit 113 may be configured to acquire a plurality of aerial images including the added position information from image DB 171, and the position information may coincide with the position information indicating the position of the UAV 100 at the time of the aerial imaging. In some embodiments, the first image acquisition unit 113 may be configured to acquire a plurality of aerial images including the added position information from image DB 171, and even if the position information may not coincide with the position information indicating the position of the UAV 100 at the time of the aerial imaging, the position information may be a position where the distance between the position and the position of the aerial imaging may be within a predetermined distance (i.e., peripheral position information).

The first image acquisition unit 113 may be configured to acquire a plurality of aerial images including the flight position indicated by the position information of the UAV 100 within the imaging range from the image DB 171. In some embodiments, the first image acquisition unit 113 may acquire all aerial images stored in the image DB 171.

Among the plurality of aerial images including the added peripheral position information stored in the image DB 171, the first image acquisition unit 113 may preferentially extract an aerial image having a smaller inclination of the imaging devices 220 and 235 when the aerial image is capture. As such, the UAV 100 and the flight system 10 may preferentially extract an aerial image whose normal direction may be closer to the direction of gravity. Therefore, the possibility of the position of the UAV 100 being included in the imaging range may be increased, and an aerial image that may well express the ground direction may be obtained.

Among the plurality of aerial images including the added peripheral position information stored in the image DB 171, the first image acquisition unit 113 may preferentially extract an aerial image with the added position information in front of the flight direction of the UAV 100. As such, the UAV 100 and the flight system 10 may acquire an aerial image including the future direction of the UAV 100, and the operator may easily operate the UAV 100 in the future.

In one embodiment, the first image acquisition unit 113 may be configured to determine the number of aerial images to be extracted from the image DB 171 based on the speed information of the UAV 100. For example, the first image acquisition unit 113 may reduce the number of aerial images to be extracted when the UAV 100 is moving at a high speed, thereby reducing the processing load involved in generating the composite image, shortening the processing time, improving the generation efficiency of the composite image, and improving the tracking performed of the high-speed movement. In addition, the first image acquisition unit 113 may increase the number of aerial images to be extracted when the UAV 100 is moving at a low speed, such that the image quality of the narrow-range composite image may be improved.

In one embodiment, the first image acquisition unit 113 may be configured to acquire a plurality of aerial images included in the aerial images stored in the image DB 171, and combine the acquired plurality of aerial images to generate a composite image. For example, the first image acquisition unit 113 may join the aerial images captured in the past to generate a wide-range composite image. In some embodiments, the first image acquisition unit 113 may perform the projective transformation on the composite image to generate a downward-facing image. Further, a plurality of aerial images may be added or averaged to obtain the composite image. In some embodiments, the composite image may be obtained by other methods based on the plurality of aerial images.

In one embodiment, the first image acquisition unit 113 may set the imaging range of the aerial image as the same range based on the plurality of aerial images acquired from the image DB 171, and generate the composite image based on the plurality of aerial images having a uniform imaging range. That is, the first image acquisition unit 113 may set the size of the plurality of aerial images acquired from the image DB 171 to be the same, and then generate the composite image. In addition, the first image acquisition unit 113 may combine parts of the plurality of aerial images acquired from the image DB 171 to generate the composite image.

In one embodiment, the first image acquisition unit 113 may be used to perform processing such as the projective transformation on the generated composite image to generate the downward-facing image. In some embodiments, the first image acquisition unit 113 may generate one composite image as the downward image based on the plurality of generated downward-facing images.

In one embodiment, a portion of the aerial image and the downward-facing image may be transmitted to the portable terminal 80 through the communication interface 150.

The information adding unit 114 may be configured to add information related to the aerial image to the aerial image captured by the imaging devices 220 and 235 as the additional information (e.g. metadata). The information adding unit 114 may transmit the aerial image including the additional information to the image DB 171 for storage. The additional information may include information related to the UAV 100 (e.g., flight information) and/or information related to the imaging devices 220 and 235 (e.g., imaging information) when capturing the aerial images. As the additional information, the information adding unit 114 may add photographing position information and the inclination information of the imaging devices 220 and 235 to the aerial image when the aerial image is captured. In some embodiments, photographing position information may be the position information of the UAV 100 when the aerial image is captured.

The information adding unit 114 may be configured to add the actual spatial range information (e.g., latitude/longitude range information) corresponding to the imaging range of the aerial image as the additional information to the aerial image, and store it in the image DB 171. As such, even if the UAV 100 that captures the aerial image is not within the actual spatial range of the imaging range corresponding to the aerial image, the UAV 100 may also acquire the aerial image including the position information of the UAV 100 within the actual spatial range corresponding to the imaging range of the aerial image.

In order to store the aerial image in the image DB 171, the UAV 100 may perform a preparatory flight within the flight range of a predetermined flight and store the aerial images including the position information within the flight range in advance. As such, the probability that the aerial image associated with the flight position of the UAV 100 may be stored in the image DB 171 may be improved.

Figure 6:
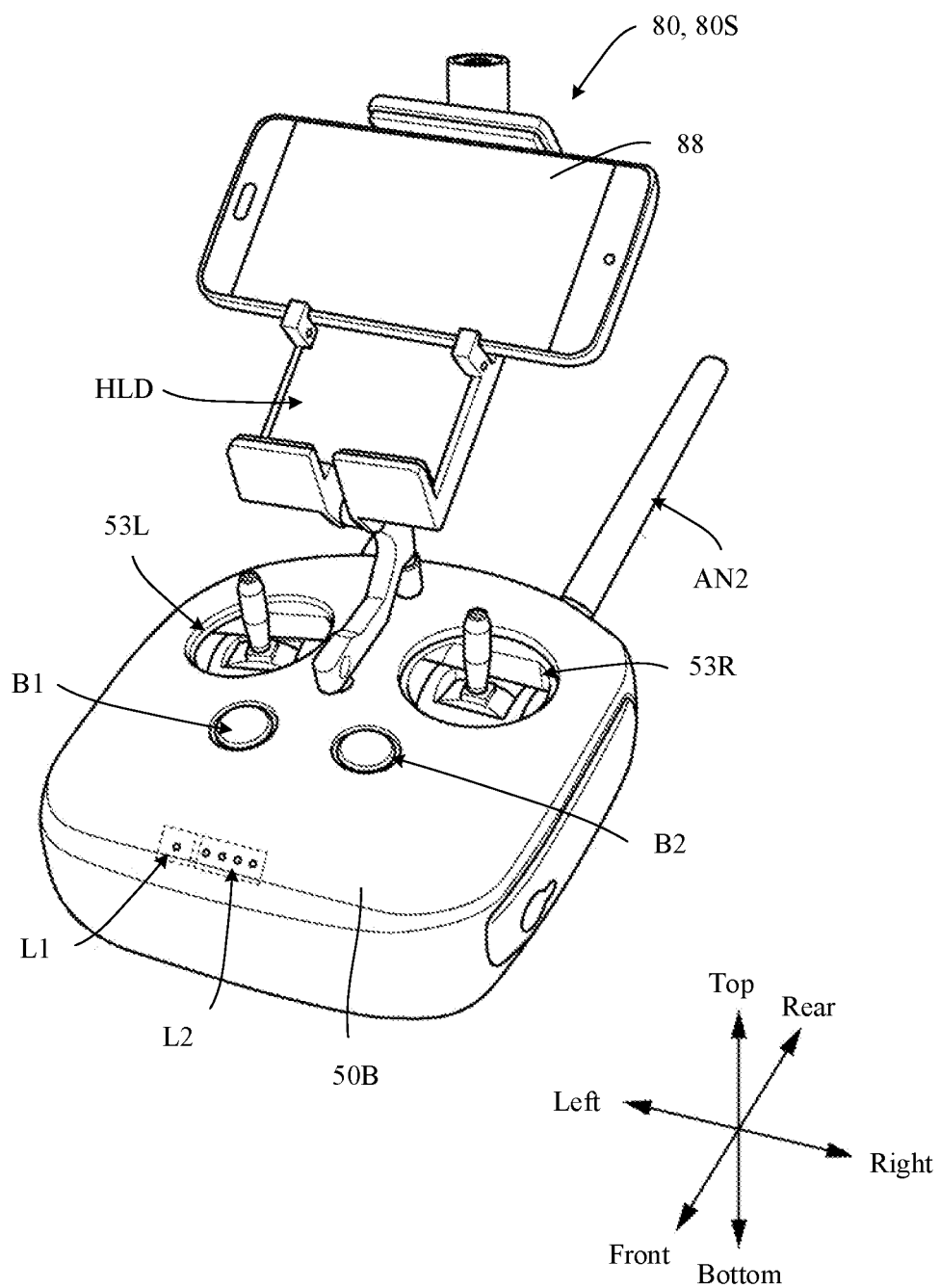
FIG. 6 a perspective view illustrating an example appearance of a transmitter and a portable terminal.

An example configuration of the transmitter 50 and the portable terminal 80 will be described below. FIG. 6 a perspective view illustrating an example appearance of a transmitter 50 and a portable terminal 80. In FIG. 6, a smartphone 80S is shown as an example of the portable terminal 80. The directions of the arrows shown in FIG. 6 are respectively observed with respect to the up, down, left, right, front, and rear directions of the transmitter 50. In some embodiments, the transmitter 50 may be used in a state in which, for example, a person who uses the transmitter 50 (hereinafter referred to as an operator) may be holding it with both hands.

The transmitter 50 may include a resin housing 50B having, for example, an approximately square bottom surface and an approximately cuboid shape (in other words, an approximately box shape) having a height shorter than a side of the bottom surface. Further, a left control lever 53L and a right control lever 53R are protruded from approximately the center of the housing surface of the transmitter 50.

The left control lever 53L and the right control lever 53R may be respectively used in the movement operation (e.g., movement control operation) for the remote control (e.g., the forward, backward, right, left, up, and down movement and the orientation change of the UAV 100) of the UAV 100 performed by the operator. The position of the initial state in which the left lever 53L or the right lever 53R is not applied with an external force from the operator's hands is shown in FIG. 6. Each of the left lever 53L and the right lever 53R may automatically return to a predetermined position (e.g., the initial position shown in FIG. 6) after the external force applied by the operator is released.

In one embodiment, a power button B1 of the transmitter 50 may be disposed on a front near side (i.e., the side of the operator) of the left control lever 53L. When the operator presses the power button B1 once, the remaining capacity of a built-in battery (not shown) for the transmitter 50 may be displayed on a remaining battery capacity display unit L2. When the operator presses the power button B1 again, for example, the power of the transmitter 50 may be turned on, and the power may be applied to each part of the transmitter 50 (see FIG. 7) to be used.

In one embodiment, a Return-To-Home (RTH) button B2 may be disposed on the front near side (i.e., the side of the operator) of the right control lever 53R. When the operator presses the RTH button B2, the transmitter 50 may transmit a signal to the UAV 100 for automatically returning the UAV 100 to a predetermined position. As such, the transmitter 50 may cause the UAV 100 to automatically return to the predetermined position (e.g., the takeoff position stored in the UAV 100). For example, the RTH button B2 may be used in the case where the operator cannot see the body of the UAV 100 when perform the aerial imaging outdoor using the UAV 100 or when the UAV 100 may not be operable due to radio wave interference or unpredicted failure.

A remote state display unit L1 and the remaining battery capacity display unit L2 may be disposed on the front near side (i.e., the side of the operator) of the power button B1 and the RTH button B2. The remote state display unit L1 may include, for example, a Light Emitting Diode (LED) and display the wireless connection state between the transmitter 50 and the UAV 100. The remaining battery capacity display unit L2 may include, for example, a LED and display the remaining capacity of the battery (not shown) built in the transmitter 50.

An antenna AN1 and an antenna AN2 may be protruding from a rear side surface of the housing 50B of the transmitter 50 on the rear side of the left control lever 53L and the right control lever 53R. The antennas AN1 and AN2 may be used to transmit a signal generated by a transmitter controller 61 to the UAV 100 based on the operations of the operators left control lever 53L and the right control lever 53R. The signal may be one of the operation input signals inputted by the transmitter 50. The antennas AN1 and AN2 may cover, for example, a transmission of 2 km. In addition, in the case where the image captured by the imaging devices 220 and 235 of the UAV 100 wireless connected to the transmitter 50 or the various data acquired by the UAV 100 is transmitted from the UAV 100, the antennas AN1 and AN2 may be used to receive these images or various data.

In FIG. 6, the transmitter 50 does not include a display portion. In some embodiments, the transmitter 50 may include a display portion.

The portable terminal 80 may be mounted on a bracket HLD, which may be coupled to the transmitter 50. As such, the portable terminal 80 may be mounted on the transmitter 50 via the bracket HLD. In one embodiment, the portable terminal 80 and the transmitter 50 may be connected by a wired cable such as a USB cable. Alternatively, the portable terminal 80 may not be mounted on the transmitter 50, as them may be separately disposed.

Figure 7:
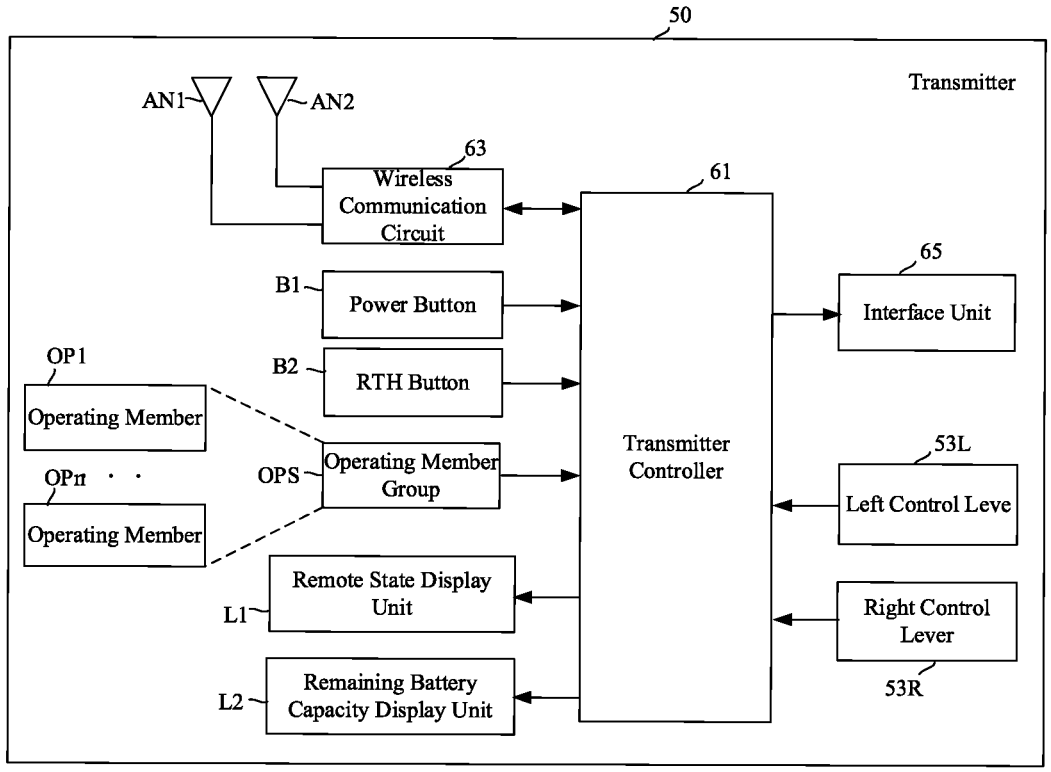
FIG. 7 is a block diagram illustrating an example hardware configuration of the transmitter according to an embodiment of the present disclosure.

FIG. 7 is a block diagram illustrating an example hardware configuration of the transmitter 50 consistent with embodiments of the present disclosure. The transmitter 50 includes the left control lever 53L, the right control lever 53R, the transmitter controller 61, a wireless communication circuit 63, an interface unit 65, the power button B1, the RTH button B2, an operating member group (OPS), the remote state display unit L1, the remaining battery capacity display unit L2, and a display unit DP. The transmitter 50 is an example of an operating device that may be used to instruct the control of the UAV 100.

The left control lever 53L may be used, for example, for the operation of remotely controlling the movement of the UAV 100 by the operator's left hand. Further, the right control lever 53R may be used, for example, for the operation of remotely controlling the movement of the UAV 100 by the operator's right hand. The movement of the UAV 100 may be, for example, a movement in a forward direction, a movement in a backward direction, a movement in the right direction, a movement in the left direction, a movement in an upward direction, a movement in a downward direction, a movement in which the UAV 100 may be rotated in the left direction, a movement in which the UAV 100 may be rotated in the right direction, or a combination thereof, and it may be the same in the following descriptions.

When the power button B1 is pressed once, a signal indicating the one time press may be transmitted to the transmitter controller 61. The transmitter controller 61 may be configured to display the remaining capacity of the battery (not shown) built in the transmitter 50 on the remaining battery capacity display unit L2 based on the signal. As such, the operator may easily check the remaining capacity of the battery built in the transmitter 50. In addition, when the power button B2 is pressed twice, a signal indicating the double-press may be transmitted to the transmitter controller 61. The transmitter controller 61 may instruct the battery (not shown) built in the transmitter 50 to supply power to each part in the transmitter 50 based on the signal. As such, the power of the transmitter 50 may be turned on, and the operator may easily start the use of the transmitter 50.

When the RTH button B2 is pressed, a corresponding signal may be transmitted to the transmitter controller 61. The transmitter controller 61 may generate a signal for automatically returning the UAV 100 to the predetermined position (e.g., the takeoff position of the UAV 100) based on the signal, and transmit the signal to the UAV 100 through the wireless communication circuit 63 and the antennas AN1 and AN2. As such, the operator may automatically return the UAV 100 to the predetermined position by performing a simple operation of the transmitter 50.

The OPS can include a plurality of operating members (e.g., operating member OP1 . . . operating member OPn, where n may be an integer greater than 2). In one embodiment, the OPS can include operating members (e.g., various operating members for providing assistance of the remote control of the UAV 100 through the transmitter 50) other than the left control lever 53L, the right control lever 53R, the power button B1, and the RTH button B2 shown in FIG. 4. The various operating members mentioned above may refer to, for example, buttons for instructing the capturing of a still image by using the imaging device 220 of the UAV 100, buttons for instructing the start and end of the recording of a moving image by using the imaging device 220 of the UAV 100, a dial for adjust the inclination of the gimbal 200 (see FIG. 4) of the UAV1 100 in the oblique direction, a button for switching the flight mode of the UAV 100, and a dial for setting the imaging device 220 of the UAV 100.

Since the remote state display unit L1 and the remaining battery capacity display unit L2 have been described with reference to FIG. 6, the description thereof will be omitted.

The transmitter controller 61 may include a processor (e.g., a CPU, a MPU, or a DSP). The transmitter controller 61 may be used to perform the signal processing for the overall control of the operation of each of part of the transmitter 50, input/output processing of data with other parts, arithmetic processing of data, and storage processing of data.

The transmitter controller 61 may be configured to acquire the captured image data captured by the imaging device 220 of the UAV 100 through the wireless communication circuit 63 and store it in a memory (not shown), and output it to the portable terminal 80 through the interface unit 65. In other words, the transmitter controller 61 may be configured to display the aerial image data captured by the imaging devices 220 and 235 of the UAV 100 on the portable terminal 80. As such, the aerial image captured by the imaging devices 220 and 235 of the UAV 100 may be displayed on the portable terminal 80.

The transmitter controller 61 may be configured to generate an instruction signal for controlling the flight of the UAV 100 through the operation of the operator's left control lever 53L and the right control lever 53R. The transmitter controller 61 may be used to remotely control the UAV 100 by transmitting the instruction signal to the UAV 100 through the wireless communication circuit 63 and the antennas AN1 and AN2. As such, the transmitter 50 may remotely control the movement of the UAV 100.

The wireless communication circuit 63 may be coupled to the two antennas AN1 and AN2. The wireless communication circuit 63 may be configured to perform the transmission and reception of information and data by using a predetermined wireless communication method (e.g., Wi-Fi) with the UAV 100 through the two antennas AN1 and AN2.

The interface unit 65 may be used to perform the input and output of information and data between the transmitter 50 and the portable terminal 80. The interface unit 65 may be, for example, a USB port (not shown) arranged on the transmitter 50. In some embodiments, the interface unit 65 may be an interface other than the USB port.

Figure 8:
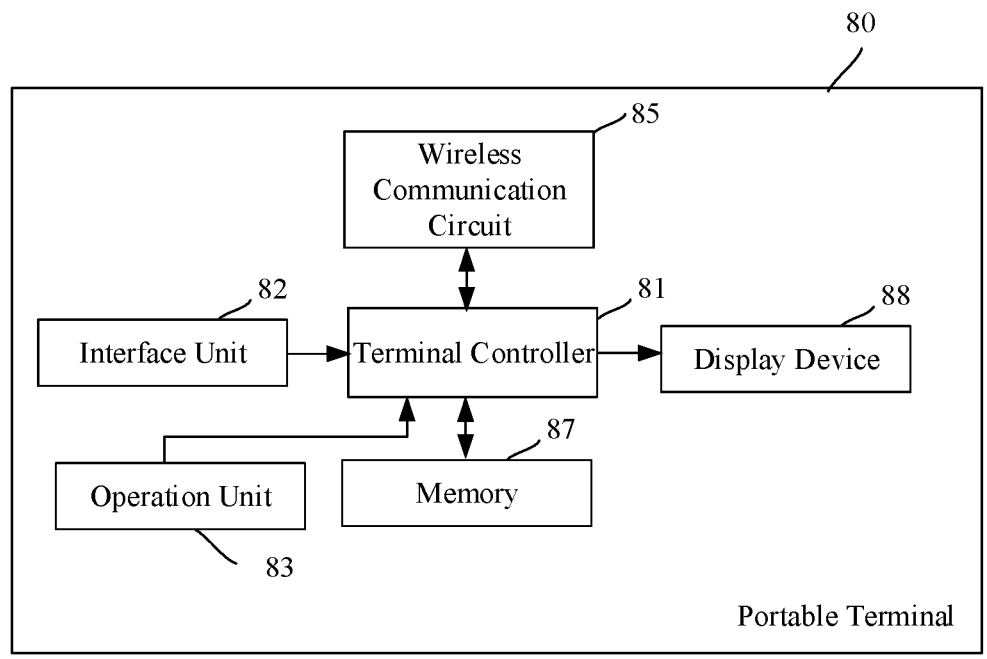
FIG. 8 is a block diagram illustrating an example hardware configuration of the portable terminal according to an embodiment of the present disclosure.

FIG. 8 is a block diagram illustrating an example hardware configuration of a portable terminal 80 consistent with embodiments of the present disclosure. The portable terminal 80 includes a terminal controller 81, an interface unit 82, an operation unit 83, a wireless communication circuit 85, a memory 87, and a display unit 88. The portable terminal 80 may be an example of a display device.

The terminal controller 81 may include, for example, a CPU, an MPU, or a DSP. The terminal controller 81 may be used to perform the signal processing for the overall control of the operation of each part of the portable terminal 80, input/output processing of data with other parts, arithmetic processing of data, and storage processing of data.

The terminal controller 81 may be configured to acquire information and data form the UAV 100 through the wireless communication circuit 85. In one embodiment, the terminal controller 81 may be configured to acquire information and data form the transmitter 50 through the interface unit 82. Further, the terminal controller 81 may be configured to acquire information and data inputted through the operation unit 83. Furthermore, the terminal controller 81 may be configured to acquire information and data stored in the memory 87. The terminal controller 81 may be used to transmit information and data to the display unit 88, and display the display information based on the information and data on the display unit 88.

In one embodiment, the terminal controller 81 may be used to execute an application for instructing the control of the UAV 100. Further, the terminal controller 81 may be used to generate various data to be used in the application.

The interface unit 82 may be used to perform the input and output of information and data between the transmitter 50 and the portable terminal 80. The interface unit 82 may be, for example, a USB connector (not shown) arranged on the portable terminal 80. In some embodiments, the interface unit 82 may be an interface other than the USB connector.

The operation unit 83 may be used to accept information and data inputted by the operator of the portable terminal 80. The operation unit 83 may include a button, a touch display screen, etc. The operation unit 83 and the display unit 88 shown here are mainly constituted by a touch display screen. In this case, the operation unit 83 may accept a touch operation, a click operation, a drag operation, etc.

The wireless communication circuit 85 may communicate with the UAV 10 through various wireless communication methods. The wireless communication methods may include, for example, a communication via a wireless LAN, Bluetooth, short-range wireless communication, or a public wireless connection.

The memory 87 may include, for example, a ROM that may be used to store data specifying a program and a set of value for the operation of the portable terminal 80, and a RAM that may be used for temporarily storing various types of data and information when the terminal controller 81 performs processing. In one embodiment, the memory 87 may include memories other than the ROM and the RAM. The memory 87 may be disposed inside the portable terminal 80. Alternatively, the memory 87 may be set to be detachable from the portable terminal 80. In addition, the program may include an application.

The display unit 88 may include, for example, a Liquid Crystal Display (LCD) to display various types of information and data outputted from the terminal controller 81. In one embodiment, the display unit 88 may be used to display aerial image data captured by the imaging device 220 of the UAV 100.

Figure 9:
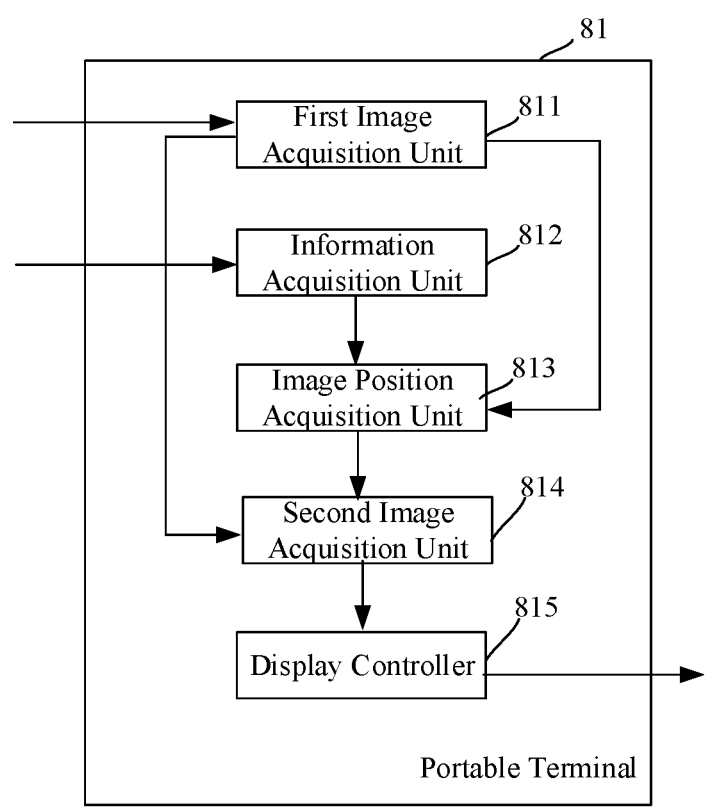
FIG. 9 is a block diagram illustrating an example functional configuration of the portable terminal according to an embodiment of the present disclosure.

FIG. 9 is a block diagram illustrating an example functional configuration of the portable terminal 80 consistent with embodiments of the present disclosure. As shown in FIG. 9, the terminal controller 81 includes a first image acquisition unit 811, an information acquisition unit 812, an image position acquisition unit 813, a second image acquisition unit 814, and a display controller 815. The image position acquisition unit 813 may be an example of a second acquisition unit, and the second image acquisition unit 814 may be an example of a generation unit.

The first image acquisition unit 811 may be configured to acquire an aerial image or a downward-facing image from the UAV 100 through the interface unit 82 or the wireless communication circuit 85.

The information acquisition unit 812 may be configured to acquire one or more of the information related to the flight from the UAV 100 and the information related to the imaging of the imaging devices 220 and 235 through the interface unit 82 or the wireless communication circuit 85.

The image position acquisition unit 813 may be configured to acquire the position information corresponding to the position of the UAV 100 (also known as the image position or the UAV position) in the downward-facing image. The image position acquisition unit 813 may be used to calculate and obtain the image position information based on the inclination of the imaging devices 220 and 235 with respect to the direction of gravity. In some embodiments, the image position acquisition unit 813 be used to calculate and obtain the image position information based on the inclination of the imaging devices 220 and 235 with respect to the direction of gravity and the viewing angle of the imaging devices 220 and 235.

The second image acquisition unit 814 may be used to superimpose the related information of the UAV 100 at the image position corresponding to the position of the UAV 100 in the downward-facing image, and generate a superimposed image. The superimposed image may be an example of a second image. The related information of the UAV 100 may include information indicating that the UAV 100 may be present in the actual spatial position corresponding to the image position in the downward-facing image. In one embodiment, the information indicating that the UAV 100 is present may be represented by an image indicating the presence of the UAV 100. The information related to the UAV 100 may include the orientation information of the UAV 100, which may be represented by an image indicating the orientation of the UAV 100. In one embodiment, the information related to the UAV 100 may include the photographing direction information of the imaging devices 220 and 235, which may be represented by an image indicating the photographing direction of the imaging devices 220 and 235. In one embodiment, the information related to the UAV 100 may include the flight direction information of the UAV 100, which may be represented by an image indicating the flight direction of the UAV 100.

The image indicating the presence of the UAV 100 may be, for example, an aerial image captured from above the UAV 100. In one embodiment, the image representing the presence of the UAV 100 may be an image schematically illustrating the situation from the aerial imaging of the UAV 100. In one embodiment, the image indicating the presence of the UAV 100 may be another image or symbol (e.g., a simple ○, Δ, □, or ×). Further, the image indicating the presence of the UAV 100 may be stored in the memory 87.

The image indicating the orientation of the UAV 100 may be indicated by an arrow image in which the orientation of the UAV 100 may be the leading end of the arrow. Therefore, the second acquisition unit 814 may adjust the orientation of the arrow image based on the orientation of the UAV 100. The image indicating the orientation of the UAV 100 may be shown by rotating the imaging representing the UVA 100. In the UAV body 102, the opposite direction of the battery (not shown) may be the travelling direction when the UAV 100 is moving forward, and may be the orientation of the UAV 100. Further, the image indicating the orientation of the UAV 100 may be stored in the memory 87.

The image indicating the photographing direction of the imaging devices 220 and 235 may be indicated by an arrow image in which the photographing direction of the imaging devices 220 and 235 may be the leading end of the arrow. Therefore, the second acquisition unit 814 may adjust the orientation of the arrow image based on the photographing direction of the imaging devices 220 and 235. Further, the image indicating the photographing direction of the imaging devices 220 and 235 may be shown by rotating the imaging representing the UAV 100. In one embodiment, the imaging device 220 may be disposed on the opposite side of the battery with respect to the UAV body 102. As such, with respect to the UAV body 102, the photographing direction may be indicated by the opposite direction of the battery. Further, the image indicating the photographing direction of the imaging devices 220 and 235 may be stored in the memory 87.

The image indicating the flight direction of the UAV 100 may be indicated by an arrow image in which the flight direction of the UAV 100 may be the leading end of the arrow. Therefore, the second acquisition unit 814 may adjust the orientation of the arrow image based on the flight direction of the UAV 100. Further, the image indicating the flight direction of the UAV 100 may be stored in the memory 87.

The display controller 815 may be used to display an aerial image and a superimposed image on the display unit 85. The display controller 815 may set the vertical direction and the horizontal direction of the image displayed on the display screen by the operator through the setting of the operation unit 83 or the like. In one embodiment, the display controller 815 may display the aerial image or the superimposed image by setting the front of the flight direction of the UAV 100 as the top of the display screen. In another embodiment, the display controller 815 may set the north side as the top of the display screen to display the aerial image or the superimposed image.

The display controller 815 may be used to switch the display of the aerial image captured by the operation camera (e.g., a secondary camera) provided to operate the UAV 100 and the aerial image captured by the photographing camera (e.g., a primary camera) for capturing the image desired by the operator. In addition, the display controller 815 may be used to configure a Picture in Picture (PinP) display mode, and superimpose the aerial image of the photographing camera on the aerial image of the operation camera. In one embodiment, the display controller 815 may be used to configure the PinP display mode in which the aerial image of the operation camera may be superimposed on the aerial image of the photographing camera. The display controller 815 may be used to switch these display modes.

An example of the setting of the imaging device 235 in the UAV 100 will be described below. In addition, the imaging device 235 may be used as the operation camera (e.g., the secondary camera) provided to operate the UAV 100. Further, the imaging device 220 may be used as the photographing camera (e.g., the primary camera) for capturing an image desired by the operator.

FIG. 10A is a perspective view illustrating an example setting of the imaging device 235 as an operation camera. The imaging device 235 may be fixedly disposed on the UAV body 102. In one embodiment, the imaging device 235 may be disposed facing downward on the UAV body 102, that is, in such a manner as to follow the photographing direction of the imaging device 235 along the direction of gravity. As such, the horizontal direction position of the imaging device 235 may be included in the imaging range of the aerial image captured by the imaging device 235. In one embodiment, the imaging device 235 may be disposed on the UAV body 102 without facing downward. As such, the first image acquisition unit 113 of the UAV 100 may be used to generate the downward image based on the aerial image captured by the imaging device 235.

By fixedly disposing the imaging device 235 on the UAV body 102, the attitude of the imaging device 235 with respect to the UAV body 102 may be fixed. The attitude of the UAV body 102 may correspond to the attitude of the UAV 100, therefore, the inclination of the imaging device 235 may be fixed with respect to the inclination of the UAV 100. As such, one of the inclination of the UAV 100 and the inclination of the imaging device 235 may be replaced with another one of the inclination of the UAV 100 and the inclination of the imaging device 235, and one parameter may be reduced. Therefore, the processing load of the various operations (e.g., the calculation of the image position) of the flight system 10 may be reduced.

FIG. 10B is a perspective view illustrating another example setting of the imaging device 235 as an operation camera. The imaging device 235 may be fixedly disposed on the gimbal 200. In one embodiment, the imaging device 235 may be disposed facing downward on the gimbal 200, that is, in such a manner as to follow the photographing direction of the imaging device 235 along the direction of gravity. As such, the horizontal direction position of the imaging device 235 may be included in the imaging range of the aerial image captured by the imaging device 235. In one embodiment, the imaging device 235 may be disposed on the gimbal 200 without facing downward. As such, the first image acquisition unit 113 of the UAV 100 may be used to generate the downward image based on the aerial image captured by the imaging device 235.

The gimbal 200 may be adjusted by changing the attitude of the imaging devices 220 and 235 supported by the gimbal 200 with respect to the UAV100, thereby ensuring the attitude of the imaging devices 220 and 235 may not change with respect to the outside of the UAV 100 even if the attitude of the UAV changes. As such, the attitude of the imaging device 235 fixedly disposed on the gimbal 200 with respect to the outside (e.g., the ground) of the UAV 100 may be maintained. Therefore, the aerial image captured by the imaging device 235 may be stabilized and the image with a relatively small deviation may be obtained.

In one embodiment, it may not be necessary to additionally provide the imaging device 235 on the UAV 100, as the imaging device 230 may include the same functions as the imaging device 235.

The image position of the UAV 100 in the aerial image captured by the imaging devices 220 and 235 will be described below.

Figure 11:
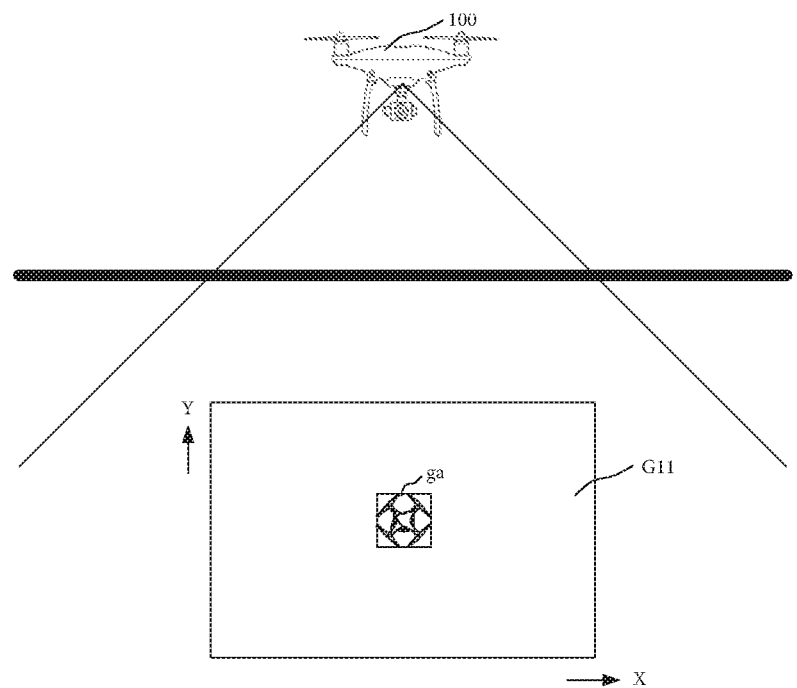
FIG. 11 is a diagram showing an example of an image position of the UAV.

FIG. 11 is a diagram for describing an example of an image position of the UAV 100. In FIG. 11, it is assumed that the horizontal direction along the ground is defined by the X-direction and the Y-direction.

In FIG. 11, the inclination of the UAV 100 with respect to the direction of gravity may be 0°, that is, the attitude of the UAV 100 may remain stable along the horizontal direction. In addition, the inclination of the imaging device 220 with respect to the UAV 100 may be 0°, that is, the photographing direction of the imaging devices 220 and 235 may be perpendicular to the UAV body 102. In this case, the photographing direction of the imaging devices 220 and 235 may coincide with the direction of gravity, and the imaging devices 220 and 235 may image the actual space directly below the UAV 100. Therefore, the center position of an aerial image G11 captured by the imaging devices 220 and 235 may be an image position GP1 of the UAV 100 in the aerial image G11.

As described in the previous embodiments, the portable terminal 80 and the flight system 10 may be configured to acquire the image position of the UAV 100 in the aerial image G11 based on the inclination of the imaging devices 220 and 235. Hence, the portable terminal 80 and the flight system 10 may be configured to acquire the image position by using the inclination of the imaging devices 220 and 235, and the inclination of the imaging devices 220 and 235 may be easily obtained by using the sensing function of the UAV 100. When the inclination of the imaging devices 220 and 235 with respect to the direction of gravity is 0°, the direction of gravity may be the normal direction with respect to the aerial image, and the imaging range may be symmetrical with respect to the normal. As such, the image position of the flying object may be the center position of the aerial image.

Figure 12:
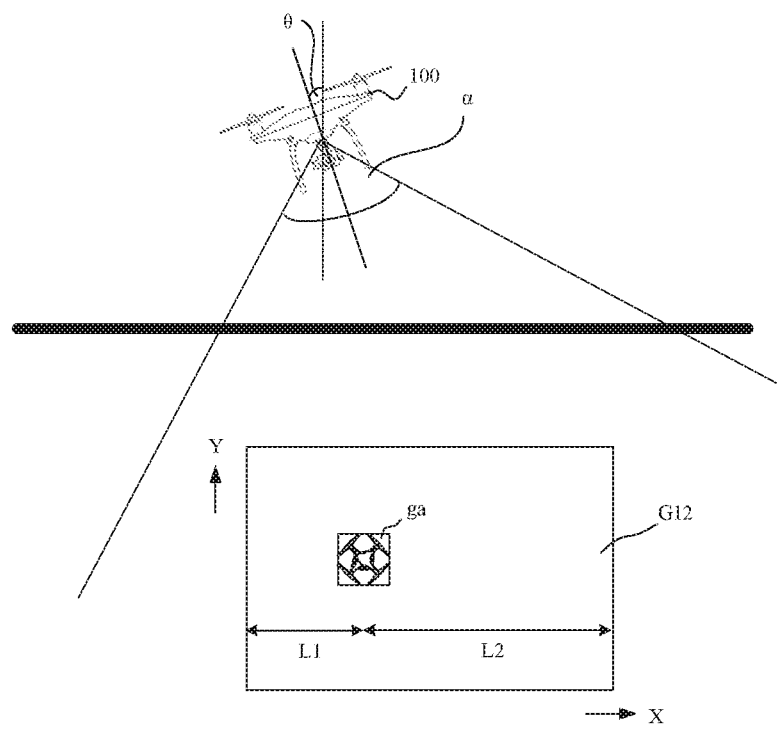
FIG. 12 is a diagram showing another example of the image position of the UAV.

FIG. 12 is a diagram for describing another example of the image position of the UAV 100. In FIG. 12, it is assumed that the horizontal direction along the ground is defined by the X-direction and the Y-direction.

In FIG. 12, the X-direction component of the inclination of the UAV 100 with respect to the direction of gravity is set to 0, and the X-direction component of the viewing angle of the imaging devices 220 and 235 is set to $\alpha$. The image position in the X-direction in an aerial image G12 captured by the imaging devices 220 and 235 may be represented by the ratio shown in the following formula (i.e., Formula 1), where L1 may represent the distance from the left end (e.g., the negative side of the X-direction) of the aerial image to the image position, and L2 may represent the distance from the image position to the right end (e.g., the positive side of the X-direction) of the aerial image.

$$L1:L2=\tan(\alpha/2-\theta):\tan(\alpha/2+\theta) \quad \text{Formula 1}$$

When $(\alpha/2-\theta)$ and $(\alpha/2+\theta)$ are angles greater than 0° and less than 90°, the values of $\tan(\alpha/2-\theta)$ and $\tan(\alpha/2+-\theta)$ may be 0 or positive values. In this case, the aerial image of the UAV 100 may be included in the aerial image G12. On the other hand, if the $(\alpha/2-\theta)$ and $(\alpha/2+\theta)$ are angles less than 0° or greater than 90°, the values of $\tan(\alpha/2-\theta)$ and $\tan(\alpha/2+\theta)$ may be negative values. In this case, the aerial image of the UAV 100 may not be included in the aerial image G12.

As described in the previous embodiments, the portable terminal 80 and the flight system 10 may be configured to acquire the image position of the UAV 100 in the aerial image based on the inclination and the viewing angle of the imaging devices 220 and 235. As such, even if the photographing direction of the imaging devices 220 and 235 are inclined to a certain extent with respect to the direction of gravity, the portable terminal 80 and the flight system 10 may acquire the image position of the UAV 100 with high precision by using the viewing angle of the imaging devices 220 and 235.

As described in the previous embodiments, even if the absolute position (e.g., the latitude and longitude) information of the UAV 100 is unclear, the portable terminal may calculate the image position of the UAV 100 as long as the relative position of the UAV 100 with respect to the image can be determined.

In addition, the calculation of the image position in the X-direction is shown in FIG. 12, and the image position in the Y-direction may also be calculated in the same manner.

The aerial image and the superimposed image will be described below.

Figure 13:
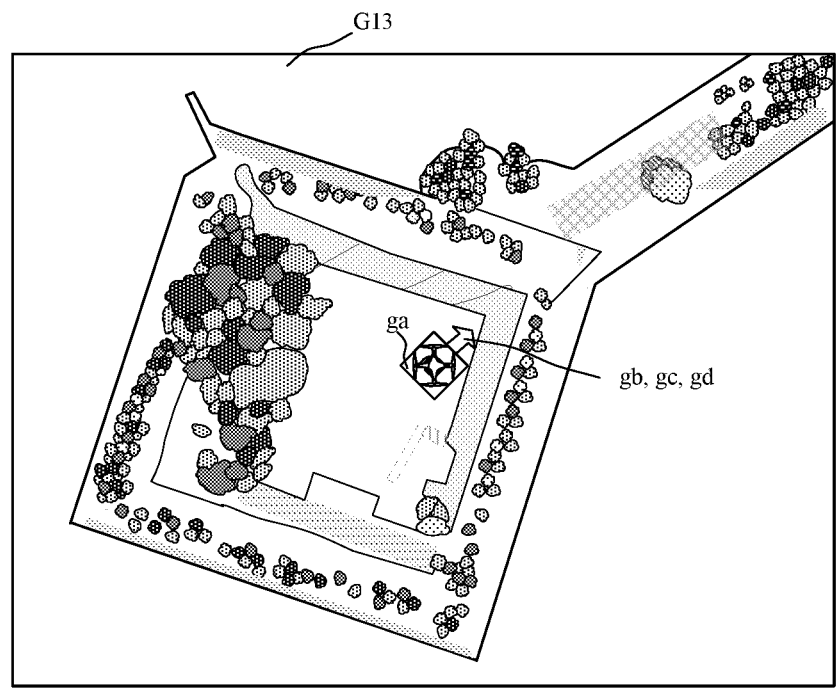
FIG. 13 is a diagram illustrating an example aerial image captured by an imaging device as a photographing camera.
Figure 14:
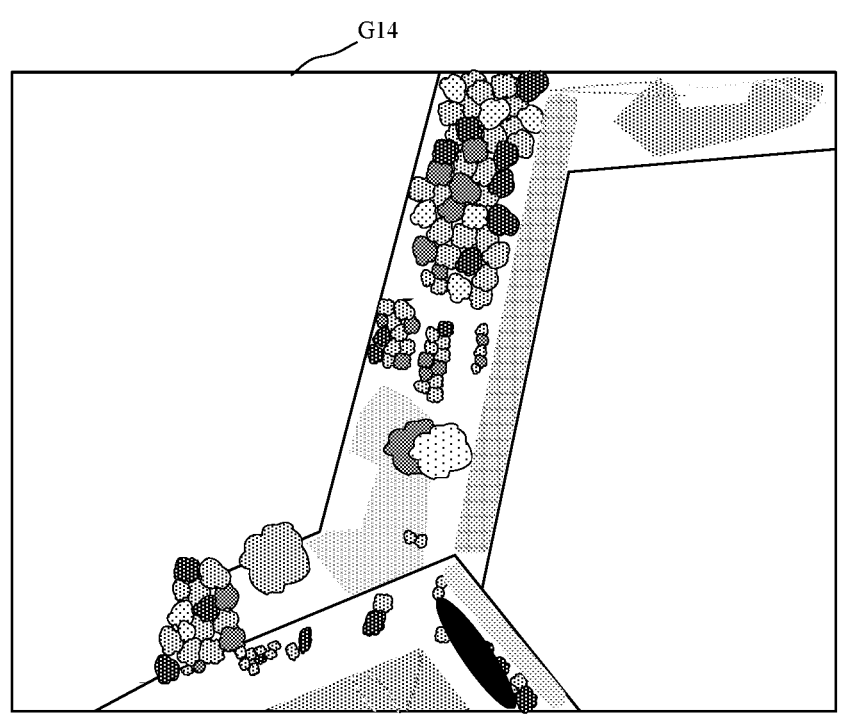
FIG. 14 is a diagram illustrating another example aerial image captured by the imaging device as an operation camera.

FIG. 13 is a diagram illustrating an example aerial image G13 captured by the imaging device 235 and FIG. 14 is a diagram illustrating another example aerial image G14 captured by the imaging device 220. In one embodiment, it is assume that the imaging device 235 may be used to capture the aerial image G13 for superimposing the related information of the UAV 100, and the imaging device 220 may be used to capture the aerial image G14 desired by the operator of the transmitter 50. That is, the photographing camera and the operation camera may be independent of each other. In addition, the related information of the UAV 100 may be superimposed on the aerial image G13 and the image shown in FIG. 13 may also be referred to as the superimposed image.

In the aerial image G13, an image ga indicating the presence of the UAV 100 is superimposed at an image position corresponding to the position of the UAV 100 in the actual space.

Therefore, with a superimposed image on which the image ga is superimposed thereon, an operator can easily identify the position of the UAV 100 (e.g., flight position) on the superimposed image. As such, the operator may easily identify at which position the UAV 100 may be flying based on the superimposed image, and the operator may easily control the UAV 100 to fly to a desired position while checking the aerial image through the transmitter 50.

An arrow image gb indicating the orientation of the UAV 100 may be superimposed on the aerial image G13. The orientation of the UAV 100 may be illustrated by the display direction of the image ga representing the UAV 100. In FIG. 13, the display direction of the image ga indicating the UAV 100 may be rotated based on the orientation of the UAV 100.

Therefore, the portable terminal 80 and the flight system 10 may be used to provide the operator with the orientation of the UAV 100, e.g., the flight direction information when the UAV 100 moves forward. As such, the operator of the transmitter 50 may easily determine which direction may be the heading direction of the UAV 100 and identify the front-rear direction or the left-right direction based on the direction, thereby facilitating the various movement control operations.

An image gc indicating the photographing direction of the imaging device 235 may be superimposed on the aerial image G13. In FIG. 13, the photographing direction may be the same as the orientation of the UAV 100, but the photographing direction may also be different from the orientation of the UAV 100.

Therefore, the portable terminal 80 and the flight system 10 may be used to provide the photographing direction information of the imaging devices 235 to the operator. As such, the operator of the transmitter 50 may perform a movement control operation on the UAV 100 based on the current photographing direction of the UAV 100, thereby easily acquiring the desired aerial image.

An image gd indicating the flight direction of the UAV 100 may be superimposed on the aerial image G13. In FIG. 13, the flight direction may be the same as the orientation of the UAV 100, but the flight direction may also be different from the orientation of the UAV 100.

Therefore, the portable terminal 80 and the flight system 10 may be used to provide the flight direction information of the UAV 100 to the operator. As such, the operator of the transmitter 50 may perform a movement control operation on the UAV 100 based on the direction toward which the UAV 100 will move.

An example of an operation of the flight system 10 will be described below.

Figure 15:
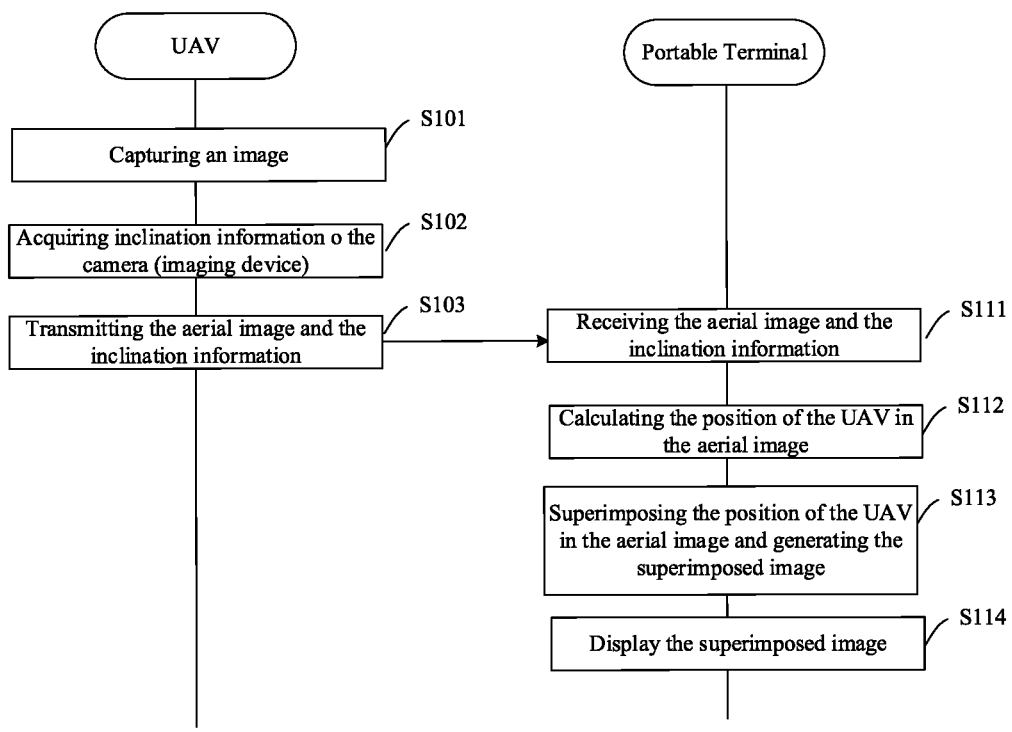
FIG. 15 is a flowchart illustrating an example operation of the flight system.

FIG. 15 is a flowchart illustrating an example operation of the flight system 10. In the example shown in FIG. 15, the flight system 10 may be assumed to include the image position within the aerial image that may correspond to the actual spatial position of the UAV 100. Further, the example operation may be implemented periodically and repeatedly during the flight of the UAV 100.

At the UAV 100, the first image acquisition unit 113 acquires the aerial image captured by the imaging devices 220 and 235 (S101). The imaging information acquisition unit 112 acquires the inclination information of the imaging devices (also referred to as the cameras) 220 and 235 (S102). The communication interface 150 transmits the aerial image acquired in S101 and the inclination information of the imaging devices 220 and 235 acquired in S102 to the portable terminal 80 (S103).

At the portable terminal 80, the first image acquisition unit 811 receives the aerial image from the UAV 100 through the interface unit 82 or the wireless communication circuit 85 (S111). The information acquisition unit 812 receives the inclination information of the imaging devices 220 and 235 through the interface unit 82 or the wireless communication circuit 85 (S111). The image position acquisition unit 813 calculates the image position corresponding to the position of the UAV 100 in the aerial image (S112). The second image acquisition unit 814 superimposes the related information (e.g., one or more of images ga, gb, gc, and gd) of the UAV 100 at the image position of the aerial image to generate the superimposed image (S113). The display controller 85 displays the superimposed image on the display unit 88 (S114).

Based on the example operation shown in FIG. 15 and described above, the portable terminal 80 and the flight system 10 may display the superimposed image including information of the UAV 100 in the image position corresponding to the position of the UAV 100 within the aerial image. Therefore, by checking the displayed superimposed image, the operator may recognize that the UAV 100 may be flying at the actual spatial position corresponding to the image position in the aerial image. As such, the operator of the transmitter 50 and the portable terminal 80 may easily fly the UAV 100 to the desired position by using the transmitter 50 while checking the aerial image. In addition, even if the map image is not prepared in advance, it may be easy to identify the position at which the UAV 100 may be flying.

Figure 16:
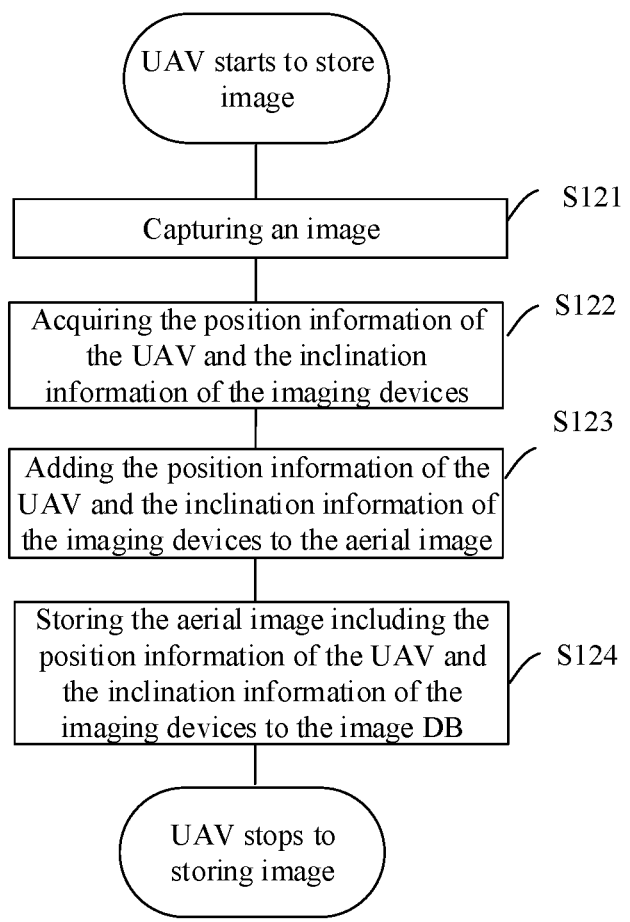
FIG. 16 is a flowchart illustrating another example operation of the flight system.

FIG. 16 is a flowchart illustrating another example operation of the flight system 10. In the example operation shown in FIG. 16, the flight system 10 may be assumed to store the aerial images. The aerial image may be stored every time the aerial image is taken, summarized and stored a predetermined number of aerial images after a predetermined number of image captures, or summarized and stored at predetermine time intervals, where the time interval for capturing the aerial images may be arbitrary.

At the UAV 100, the first image acquisition unit 113 acquires the aerial image captured by the imaging devices 220 and 235 (S121). The flight information acquisition unit 111 acquires the position information of the UAV 100 (S122). The position information may be the position information of the UAV 100 when the aerial image is captured in S121. The imaging information acquisition unit 112 acquires the inclination information of the imaging devices 220 and 235 (S122). The inclination information may be the inclination information of the imaging devices 220 and 235 when the aerial image is captured in S121.

The information adding unit 114 adds the position information of the UAV 100 acquired in S122 and the inclination information of the imaging devices 220 and 235 to the aerial image acquired in S121 as the additional information related to the aerial image (S123). In addition, the information adding unit 114 stores the aerial image of which the additional information may be added in the image DB 171 (S124).

Based on the example operation shown in FIG. 16, the UAV 100 may associate and store the captured aerial image with additional related information of the aerial image. As such, even if the aerial image is not processed after the aerial image is captured, the UAV 100 may extract the aerial image associated with the additional information by using at least one piece of additional information as a keyword. As such, the UAV 100 may extract, for example, the aerial image that matches the flight position of the UAV 100, and use it as an original image for generating the downward-facing image.

Figure 17:
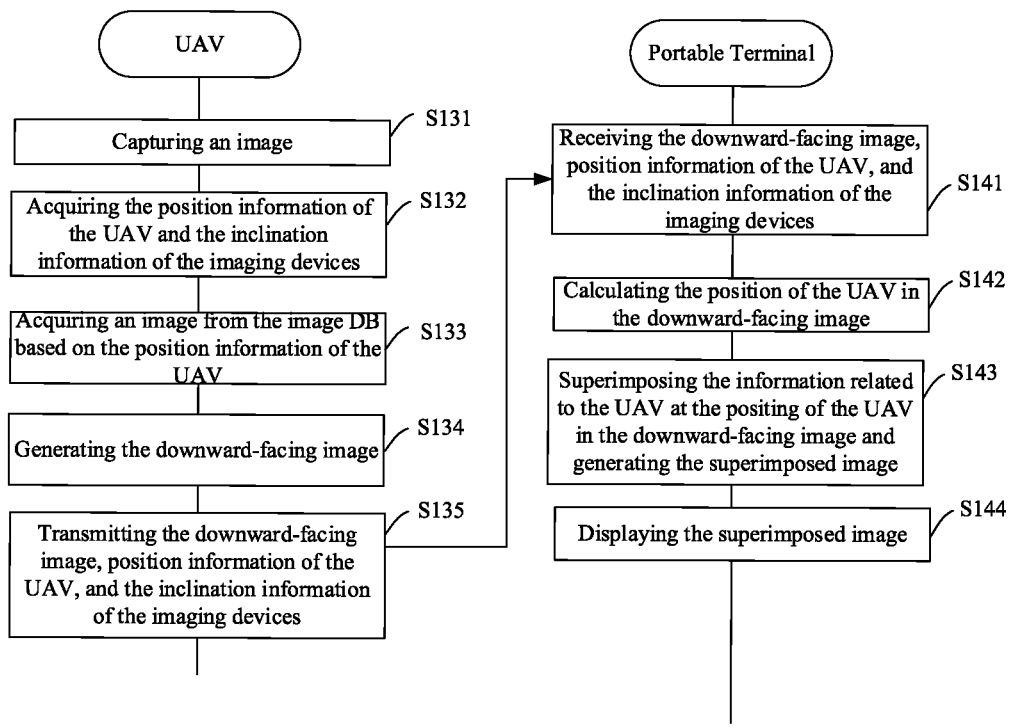
FIG. 17 is a flowchart illustrating another example operation of the flight system.

FIG. 17 is a flowchart illustrating another example operation of the flight system 10. In the example operation shown in FIG. 17, the flight system 10 may be assumed to not include the image position within the aerial image that corresponds to the actual spatial position of the UAV 100. In addition, the flight system 10 may be used to implement the example operation shown in FIG. 17 even if the aerial image includes the image position corresponding to the actual spatial position of the UAV 100. Further, the example operation of FIG. 17 may be implemented periodically and repeatedly during the flight of the UAV 100.

At the UAV 100, the first image acquisition unit 113 acquires the aerial image captured by the imaging devices 220 and 235 (S131). The flight information acquisition unit 111 acquires the position information of the UAV 100 (S132). The position information may be the position information of the UAV 100 when the aerial image is captured in S131. The imaging information acquisition unit 112 acquires the inclination information of the imaging devices 220 and 235 (S132). The inclination information may be the inclination information of the imaging devices 220 and 235 when the aerial image is captured in S131.

The first image acquisition unit 113 acquires one or more aerial images from the image DB 171 based on the position information of the UAV 100 acquired in S132 (S133). The first image acquisition unit 113 performs processing such as the projective transformation on one or more aerial images based on the inclination information added to each of the acquired one or more aerial images, and generate one or more downward-facing images (S134). In some embodiments, the first image acquisition unit 113 combines the generated plurality of downward-facing images to generate one downward-facing image. The communication interface 150 may be used to transmit the downward-facing image generated in S134, and the position information of the UAV 100 and the inclination information of the imaging devices 220 and 235 acquired in S132 to the portable terminal 80 (S135).

At S135, the first image acquisition unit 113 may not acquire the one or more aerial images from the image DB 171. In this case, the aerial image acquired in S131 may be subjected to the projective transformation or the like based on the inclination information of the imaging devices 220 and 235 acquired in S132 and S134 to generate the downward-facing image. In addition, in S134, first image acquisition unit 113 may be used to generate a downward-facing image based on one aerial image acquired in S131, one or more aerial images acquired from the image DB 171, and the inclination information of the imaging devices 220 and 235 associated with the aerial images, respectively.

At the portable terminal 80, the first image acquisition unit 113 receives the downward-facing image from the portable terminal 80 through the interface unit 82 or the wireless communication circuit 85 (S141). The information acquisition unit 812 receives the position information of the UAV 100 and the inclination information of the imaging devices 220 and 235 from the portable terminal 80 through the interface unit 82 or the wireless communication circuit 85 (S141). The image position acquisition unit 813 calculates the image position corresponding to the position of the UAV 100 in the aerial image (S142). The second image acquisition unit 814 superimposes the related information (e.g., one or more of images ga, gb, gc, and gd) of the UAV 100 at the image position of the downward-facing image to generate the superimposed image (S143). The display controller 815 displays the superimposed image on the display unit 88 (S144).

Based on the example operation shown in FIG. 17, the portable terminal 80 and the flight system 10 may be used to display the superimposed image including the related information of the UAV 100 in the image position corresponding to the position of the UAV 100 in the downward-facing image. Therefore, by checking the displayed superimposed image, the operator may recognize that the UAV 100 may be flying at the actual spatial position corresponding to the image position in the downward-facing image. As such, the operator of the transmitter 50 and the portable terminal 80 may easily fly the UAV 100 to the desired position by using the transmitter 50 while checking the downward-facing image. In addition, even if the map image is not prepared in advance, it may be easy to identify the position at which the UAV 100 may be flying.

In addition, the photographing direction of the imaging devices 220 and 235 is inclined to a certain extent with respect to the direction of gravity, the aerial image captured by the UAV 100 in flight may not include the image position corresponding to the flight position of the UAV 100. By combining the viewing angle of the imaging devices 220 and 235, the UAV 100 and the flight system 10 may still generate the downward-facing image that may include the image position corresponding to the flight position of the UAV 100. Even for the imaging devices 220 and 235 other than the imaging device 235 fixed relative to the ground direction, the UAV 100 and the flight system 10 may still superimpose the image information corresponding to the position of the UAV 100 based on the capture aerial image. Therefore, the operator may easily identify the position of the UAV 100 in real time.

In addition, the aerial images captured by the UAV 100 in the past may be stored in the image DB 171, and the UAV 100 and the flight system 10 may generate the downward-facing image by using the aerial images. As such, even if the image position of the UAV 100 is not included in the aerial image during the current flight, the UAV 100 and the flight system 10 may still generate the downward-facing image as the image including the image position of the UAV 100 based on the aerial image of the same position or the surrounding positions of the current flight position. Further, when a plurality of aerial images are acquired from the image DB 171, the image quality of a composited image may be improved even if the image quality of one aerial image may not be good. Therefore, the operator may check the superimposed image based on the composited image while easily perform the movement control operation on the UAV 100.

In addition, in the UAV 100, the first image acquisition unit 113 may be used to generate the downward-facing image in which the direction of gravity may be the normal direction based on one or more aerial images and the inclination information of the imaging devices 220 and 235 related to the aerial image. As such, the UAV 100 may generate the downward-facing image in which the image position of the UAV 100 may coincide with the center position of the imaging range, and acquire the downward-facing image centered on the flight position of the UAV 100. Therefore, the operator may clearly appreciate the periphery of the UAV 100.

In addition, in the flight system 10, the transmitter 50 may also include the functions of the portable terminal 80. In this case, the portable terminal 80 may be omitted. In addition, the portable terminal 80 may also include the functions of the transmitter 50. In this case, the transmitter 50 may be omitted.

A modified embodiment of the flight system 10 will be described below. The flight system 10A (not shown) related to the modification may include a UAV 100A (not shown), a transmitter 50, and a portable terminal 80A (not shown). In the description of the modified embodiment, the description of the same contents as the flight system 10 will be omitted or simplified.

Figure 18:
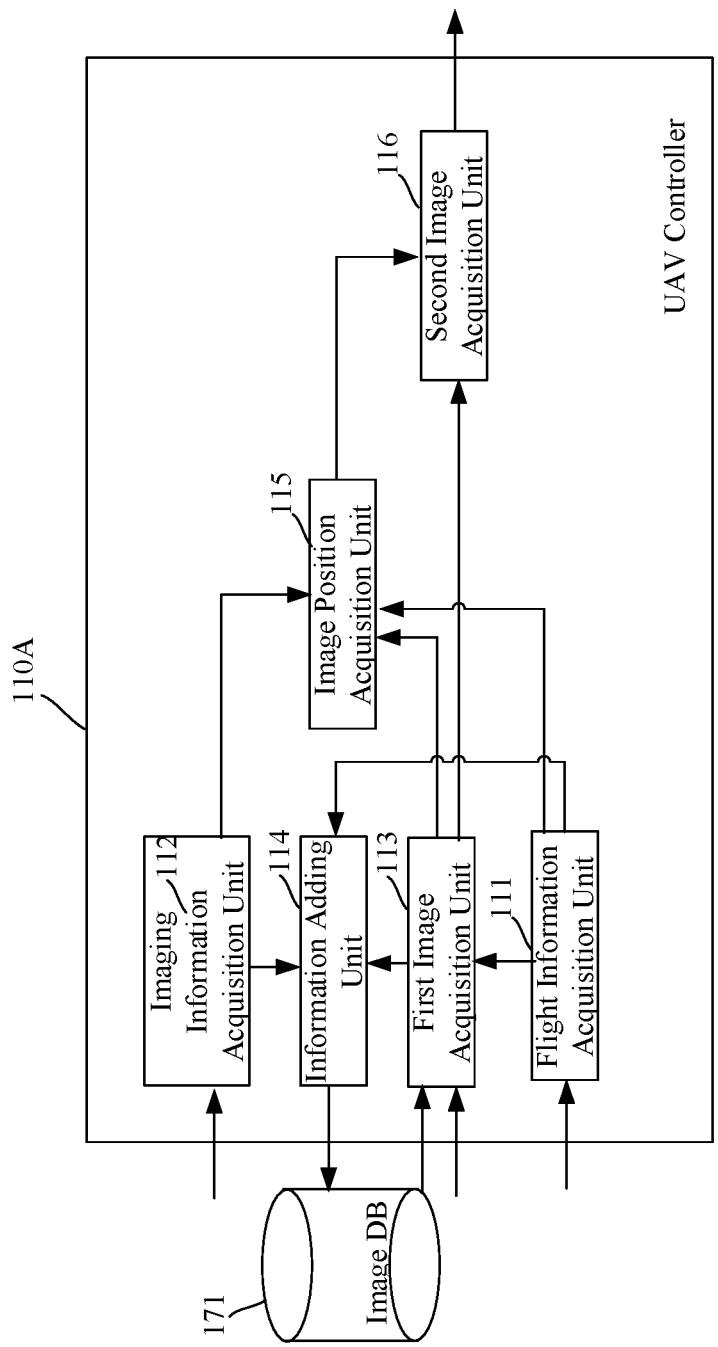
FIG. 18 is a block diagram illustrating a functional configuration of a modified UAV.

FIG. 18 is a block diagram illustrating a functional configuration of the UAV 100A, which may be a modification of the UAV 100. As shown in FIG. 18, the UAV 100A includes a UAV controller 110A in place of the UAV controller 110. The UAV controller 110A includes a flight information acquisition unit 111, an imaging information acquisition unit 112, a first image acquisition unit 113, an information adding unit 114, an image position acquisition unit 115, and a second image acquisition unit 116. That is, the UAV controller 110A additionally includes the image position acquisition unit 115 and the second image acquisition unit 116 as compared with the UAV controller 110. The image position acquisition unit may be an example of the second acquisition unit, and the second image acquisition unit may be an example of a generation unit.

The image position acquisition unit 115 may include the same functions as the image position acquisition unit 813 shown in FIG. 9. The second image acquisition unit 116 may include the same functions as the second image acquisition unit 814 shown in FIG. 9.

Figure 19:
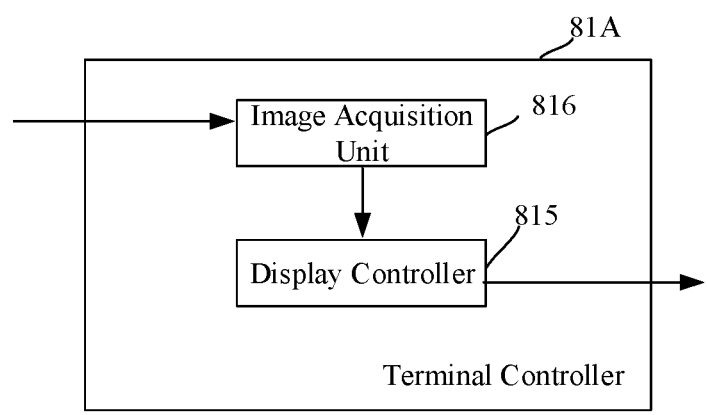
FIG. 19 is a block diagram illustrating a functional configuration of a modified portable terminal.

FIG. 19 is a block diagram illustrating a functional configuration of the portable terminal 80A which is a modification of the portable terminal 80. As shown in FIG. 19, the portable terminal 80A includes a terminal controller 81A instead of the terminal controller 81. The terminal controller 81A includes an image acquisition unit 816 and a display controller 815. The image acquisition unit 816 may be configured to acquire a superimposed image from the UAV 100A through the interface unit 82 or the wireless communication circuit 85.

That is, in the flight system 100A, the UAV 100A may be used to perform a process from imaging an aerial image to generating a superimposed image, and transmit the superimposed image to the portable terminal 80. The portable terminal 80A may be used to receive the superimposed image from the UAV 100A and display the superimposed image. As such, the flight system 10A may be used to complete the image processing such as the generation of the downward-facing image, determination of the image position of the UAV 100A, generation of the superimposed image, and the like in the UAV 100A. Therefore, the flight system 10A may be used to alleviate the processing load of the portable terminal 80A. In addition, the portable terminal 80A may be used to perform the image reception and display, and therefore, the portable terminal 80A may be replaced with, for example, a display device having low image processing capability or no image processing function.

In addition, the allocations of the functions included in the flight system may not be limited to those of the flight system 10 or the flight system 10A described above. For example, the portable terminal 80 may also include the function of generating the downward-facing image. In addition, in the flight systems 10 and 10A, the UAVs 100 and 100A may be used to perform processing from imaging the aerial image to determining the image positions of the UAVs 100 and 100A, and the portable terminal 80A may be used to perform the generation and display of the superimposed image.

As described in the previous embodiments, the flight system 10, 10A may distribute the functions required from capturing the aerial image to displaying the superimposed image to the respective devices. For example, the flight system 10, 10A may distribute the functions to the UAV 100, 100A and the portable terminal 80, 80A based on the performance of the UAV 100, 100A and/or the performance of the portable terminal 80, 80A. As such, the flight system 10, 10A may prevent the processing load of any one of the UAV 100, 100A, and the portable terminal 80, 80A from being excessively heavy or light, and distribute the functions with the appropriate processing balance.

In embodiments, the UAV described above and other UAVs may form a flight group and fly together.

Figure 20:
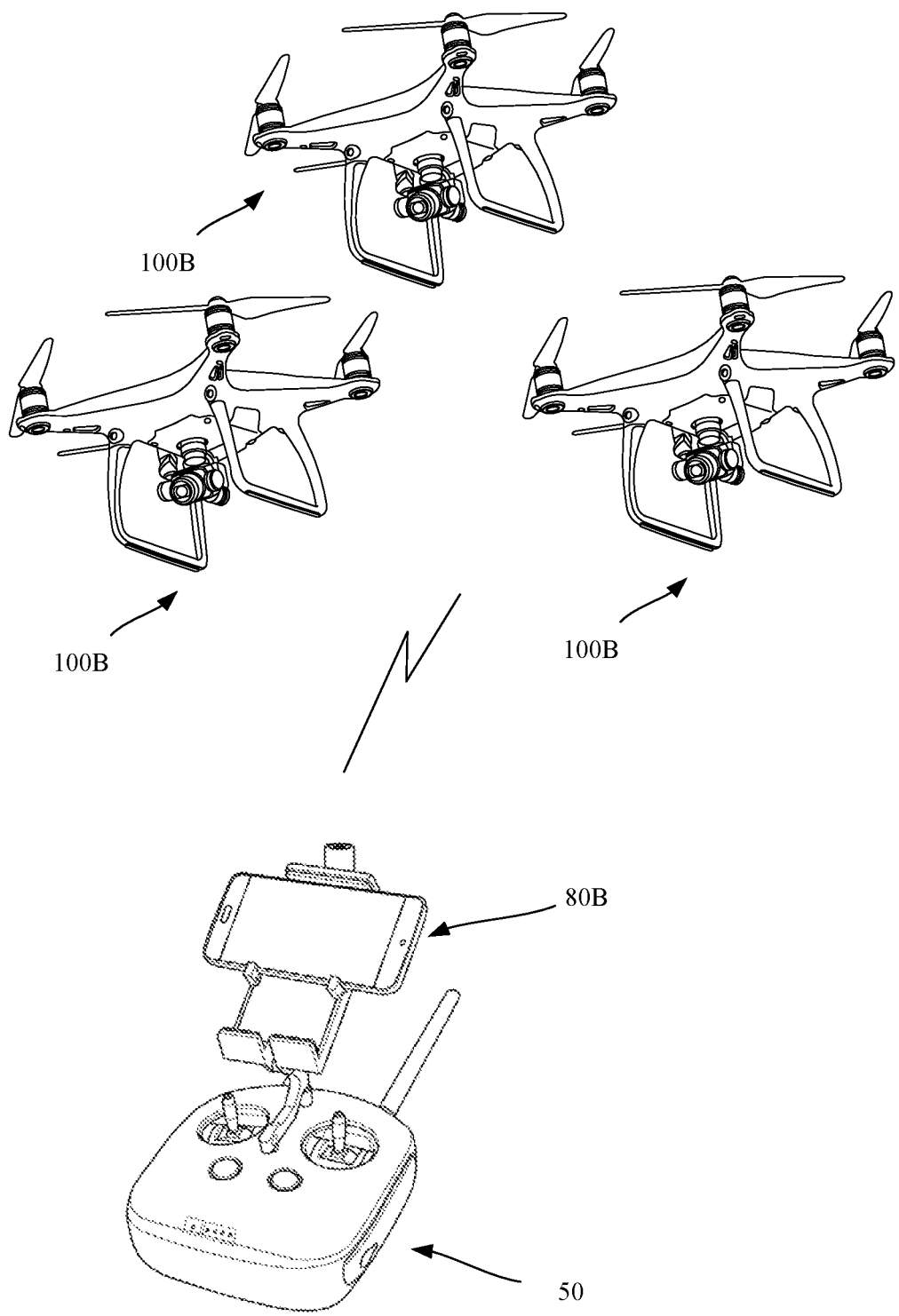
FIG. 20 is a diagram illustrating an example configuration of a flight system according to another embodiment of the present disclosure.

FIG. 20 is a diagram illustrating an example configuration of a flight system 10B consistent with embodiments of the present disclosure. As shown in FIG. 20, the flight system 10B includes a plurality of UAVs 100B, a transmitter 50, and a portable terminal 80B. The UAV 100B, the transmitter 50, and the portable terminal 80B may communicate with each other by wired communication or wireless communication (e.g., a wireless LAN). In the embodiments described below, the same configurations and operations as those of the embodiments described above are omitted or simplified.

Figure 21:
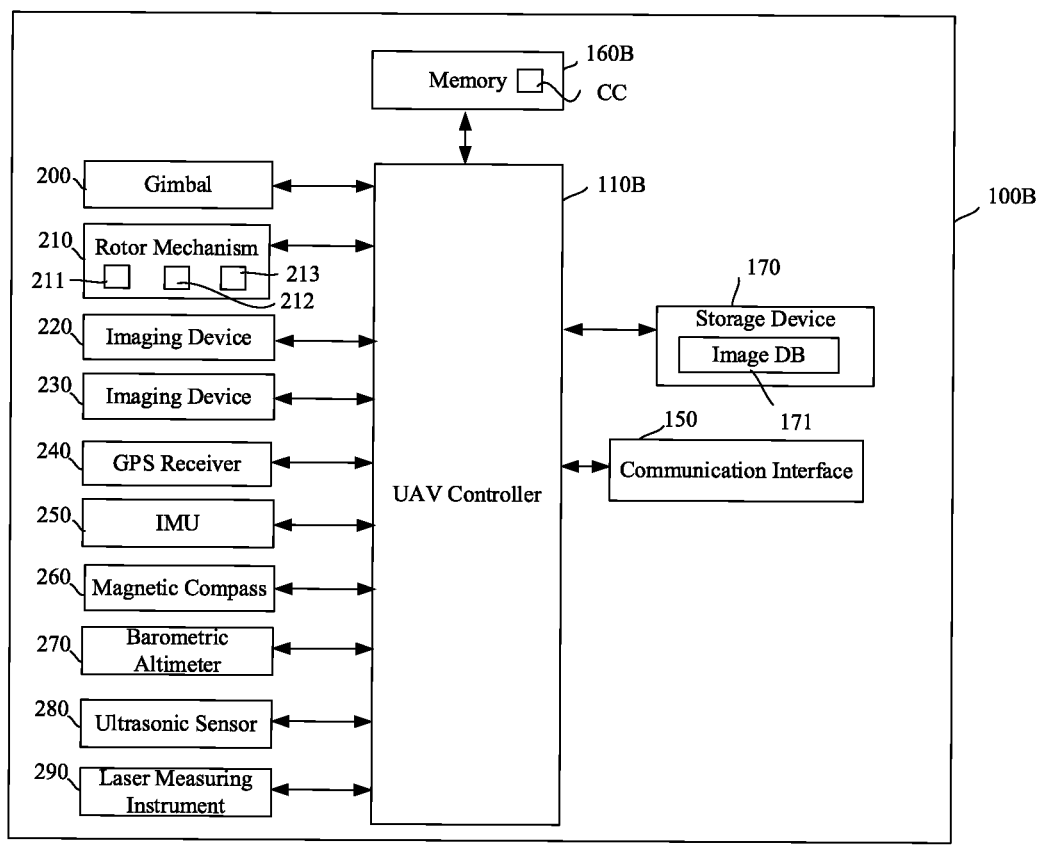
FIG. 21 is a block diagram illustrating an example hardware configuration of a UAV according to an embodiment of the present disclosure.

FIG. 21 is a block diagram illustrating an example hardware configuration of the UAV 100B consistent with embodiments of the present disclosure. Compared to the UAV 100 described above, the UAV 100B includes a UAV controller 110B instead of the UAV controller 110, and a memory 160B instead of the memory 160. In the UAV 100B of FIG. 21, the same configuration as those of the UAV 100 in FIG. 4 are denoted by the same reference numerals, and the description thereof will be omitted or simplified.

The memory 160B may include the functions of the memory 160 and store the coordinated control information CC. The coordinated control information CC may include the control information for ensuring the coordinated flight of the plurality of UAVs 100B belonging to the same flight group. The coordinated control information CC may include the relative position information of the plurality of UAVs 100B belonging to the same flight group. For example, the coordinated control information CC may include the relative position information between a reference position RP of the plurality of UAVs 100B belonging to the same flight group and a UAV 100B (e.g., the local aircraft). The relative position information may include distance information indicating a distance between the reference position RP and each of the UAVs 100B. In one embodiment, the relative position information may include direction information indicating a direction in which each of the UAVs 100B may be observed from the reference position RP. The reference position RP may be an intermediate position, a center position, or a center of gravity position of the plurality of UAVs 100B included in the same flight group, or another position that can be used as a reference. The coordinated control information CC may be saved in the memory 160B before the plurality of UAVs 100B perform the coordinated flight according to the flight operation of the transmitter 50.

The memory 160B may store a plurality of pieces of different coordinated control information CC for the same group. For example, the memory 160B may store a plurality of pieces of different relative position information of the same flight group. As such, the plurality of UAVs 100B may maintain various different relative positional relationships and fly.

Figure 22:
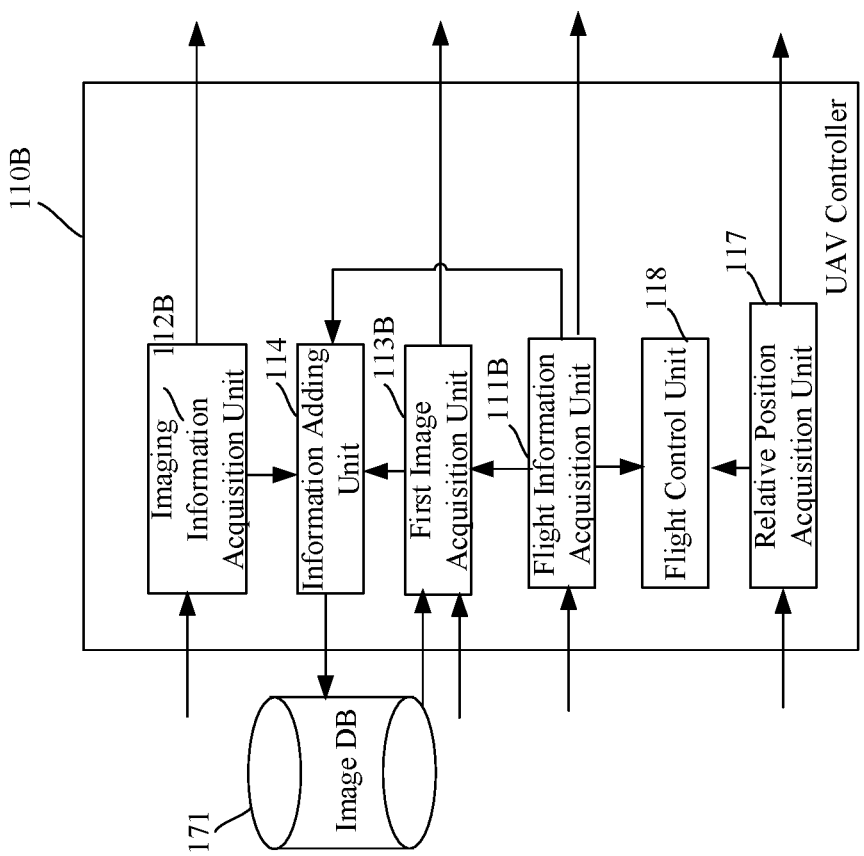
FIG. 22 is a block diagram illustrating an example functional configuration of the UAV according to an embodiment of the present disclosure.

FIG. 22 is a block diagram illustrating an example functional configuration of the UAV controller 110B consistent with embodiments of the present disclosure. As shown in FIG. 22, the UAV controller 110B includes a flight information acquisition unit 111B, an imaging information acquisition unit 112B, a first image acquisition unit 113B, an information adding unit 114B, a relative position acquisition unit 117, and a flight controller 118. The relative position acquisition unit 117 may be an example of a ninth acquisition unit. In the UAV controller 110B shown in FIG. 22, the same configurations as those of the UAV controller 110 shown in FIG. 5 are denoted by the same reference numerals, and the description thereof will be omitted or simplified.

The flight information acquisition unit 111B may include the following functions in addition to the functions of the flight information acquisition unit 111. In one embodiment, the flight information acquisition unit 111B may be configured to acquire information on the flight of the plurality of UAVs 100B belonging to the same flight group. The information related to the flight of each of the UAVs 100B may include the flight position information of each of the UAVs 100B, the orientation information of each of the UAVs 100B, and the flight direction information of each of the UAVs 100B. The method of acquiring the information related to the flight of each of the UAVs 100B may be the same, and at least a portion of the information related to the flight of each of the UAVs 100B may be transmitted to the portable terminal 80B through the communication interface 150.

The imaging information acquisition unit 112B may include the following functions in addition to the functions of the imaging information acquisition unit 112. In one embodiment, the imaging information acquisition unit 112B may be configured to acquire imaging related information of each of the imaging devices 220 and 235 included in each of the plurality of UAVs 100B belonging to the same flight group. The imaging related information of each of the imaging devices 220 and 235 may include the photographing direction information of each of the imaging devices 220 and 235, the inclination information of each of the imaging devices 220 and 235, and the viewing angle information of each of the imaging devices 220 and 235. The method of acquiring the imaging related information of each of the imaging devices 220 and 235 may be the same, and at least a portion of the inclination information of each of the imaging devices 220 and 235 may be transmitted to the portable terminal 80B through the communication interface 150.

The first image acquisition unit 113B may include the following functions in addition to the functions of the first image acquisition unit 113. In one embodiment, the first image acquisition unit 113B may be configured to acquire the aerial image captured by the imaging devices 220 and 235. In the aerial image, each image position corresponding to the horizontal position of each of the UAVs 100B belonging to the flight group may or may not be included in the related imaging range. That is, the image position of all UAVs 100B may be included in the imaging range of the aerial image, or may not include at least a portion of the image position of the UAVs 100B. In the downward-facing image based on the aerial image, at least a portion of the image position in the UAVs 100B belonging to the flight group may be included in the imaging range thereof.

In one embodiment, the first image acquisition unit 113B may be configured to acquire the aerial image captured by imaging devices 220 and 235 of the other UAVs 100B through the communication interface 150. In the aerial image captured by the UAV 100B (e.g., the local aircraft) and one or more aerial images captured by the other UAVs 100B (e.g., the other aircrafts), the first image acquisition unit 113B may generate a composite image based on two or more aerial images. In the composite image, each image position corresponding to the horizontal direction position of each of the UAVs 100B belonging to the flight group may or may not be included when the composite image is captured or when the original aerial image of the composite image is captured within the related imaging range. That is, the image position of all UAVs 100B may be included in the imaging range of the composite image, or at least a portion of the image position of the UAVs 100B may not be included in the imaging range of the composite image. However, the likelihood of the image position of the UAV 100B being included in the imaging range of the composite image may be higher as compared with the aerial image captured by one UAV. In the downward-facing image based on the aerial image, at least a portion of the image position in the UAVs 100B belonging to the flight group may be included in the imaging range thereof.

In the aerial image captured by the UAV 100B (e.g., the local aircraft), one or more aerial images captured by the other UAVs 100B (e.g., the other aircrafts), and one or more aerial images stored in the image DB 171, the first image acquisition unit 113B may generate a composite image based on two or more aerial images.

For the composite image based on the aerial image of the plurality of UAVs 100B, the first image acquisition unit 113B may be used to perform the projective transformation based on the inclination of the imaging devices 220 and 235 when the original aerial image for generating the composite image is captured, thereby generating the downward-facing image. For example, when the normal direction of the composite image is inclined with respect to the direction of gravity, the first image acquisition unit 113B may be used to perform the projective transformation in the normal direction of the direction of gravity to generate the downward-facing image. As such, the likelihood of more image positions of the UAV 100B being within the imaging range of the composite image may be higher.

When the imaging range of the composite image includes the image position corresponding to the horizontal direction position of the at least one UAV 100 when the composite image is captured or when the original aerial image for generating the composite image is captured, the downward image may be the composite image. When the imaging range of the composite image does not include the image position corresponding to the horizontal direction position of all the UAVs 100 when the composite image is capture or when the original aerial image for generating the composite image is captured, the first image acquisition unit 113B may be used to generate the downward-facing image based on the composite image.

In one embodiment, at least a portion of the aerial image, the composite image, and the downward-facing image may be transmitted to the portable terminal 80B through the communication interface 150.

As described in the previous embodiments, the UAV 100B and the flight system 10B may synthesize a plurality of aerial images captured by the plurality of UAVs 100B to generate a composite image, and generate a downward-facing image based on the composite image. As such, in a case where the aerial imaging range of one UAV 100B is insufficient, the UAV 100B and the flight system 10B may generate a wide-range aerial image as the composite image. By using the downward-facing image based on the composite image, for example, when a plurality of UAVs 100B belonging to the same flight group are ensured to perform the coordinated flight over a relatively long distance, the likelihood of the image position corresponding to the actual spatial position of each of the UAVs 100B being included in the imaging rage of the downward-facing image may be higher. The portable terminal 80B may be used to superimpose and display the image position of each of the UAVs 100B in the downward-facing image. As such, the operator may confirm the respective positions of the plurality of UAVs 100B in the downward-facing image having a wider geographical coverage.

The relative position acquisition unit 117 may be configured to acquire the relative position information of the plurality of UAVs 100B belonging to the same flight group. Further, the relative position acquisition unit 117 may be configured to acquire the relative position information from the memory 160B. Furthermore, the relative position acquisition unit 117 may be configured to acquire the relative position information from an external device (e.g., the portable terminal 80B) through the communication interface 150.

The relative position information may include the relative position information of the UAV 100B (e.g., the local aircraft) with respect to the reference position RP based on the reference position RP in the flight group. Further, the relative position information may include the relative position information of other UAVs 100B (e.g. the other aircrafts) with respect to the reference position RP.

The relative position information may include the relative position information of the UAB 100B (e.g., the local aircraft) with respect to an arbitrary UAV 100B based on any UAV 100B in the flight group. Further, the relative position information may include the relative position information of other UAVs 100B (e.g. the other aircrafts) with respect to an arbitrary UAV 100B based on any UAV 100B in the flight group. That is, the position of any UAV 100B may be set as the reference position RP.

When the relative position information of the local aircraft and the relative position information of the other aircrafts are included, the relative position acquisition unit 117 may recognize and acquire the relative position information of the local aircraft by referring to the identification information of the UAV 100B associated with the relative position information.

In one embodiment, the relative position information may be transmitted to the portable terminal 80B through the communication interface 150.

The flight controller 118 may fix the relative positional relationship of the plurality of UAVs 100B belonging to the same flight group and control the flight of the UAV 100B (e.g., the local aircraft). The flight controller 118 may fix the relative positional relationship of the UAV 100B with respect to the reference position RP and control the flight of the UAV 100B (e.g., the local aircraft). As such, the relative positional relationship of each of the UAVs 100B belonging to the flight group with respect to the reference position RP may be fixed. Therefore, the relative positional relationship of the entire plurality of UAVs 100B belonging to the flight group may also be fixed.

The fixed relative positional relationship may include not changing the distance of the UAV 100B relative to the reference position RP and keeping it unchanged. Further, the fixed relative positional relationship may also include not changing the photographing direction (e.g., the direction of travel of the flight group as it advances) of the imaging devices 220 and 235 with respect to the reference direction, and keeping it unchanged.

The flight controller 118 may be used to perform the flight control on the plurality of UAVs 100B based on a plurality of pieces of different relative position information of the same flight group to include different relative positional relationships. As such, the UAV 100B may change the relative positional relationship of the plurality of UAVs 100B by changing the relative position information used.

As described in the previous embodiments, the UAV 100B may perform the flight control by using the flight controller 118 in conjunction with the relative position information (e.g., maintaining a relative positional relationship) between the plurality of UAVs 100B.

Figure 23:
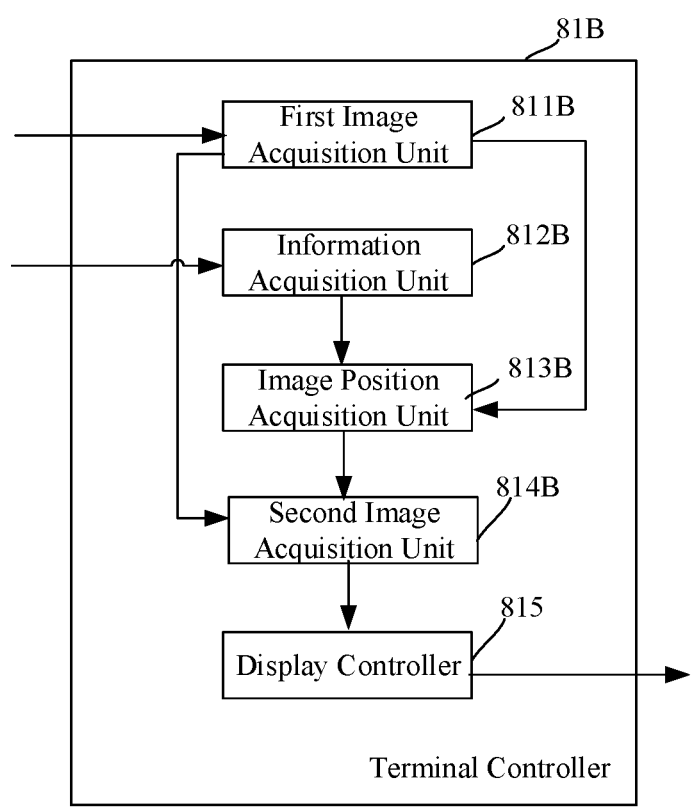
FIG. 23 is a block diagram illustrating an example functional configuration of the portable terminal according to an embodiment of the present disclosure.

FIG. 23 is a block diagram illustrating an example functional configuration of the portable terminal 80B consistent with embodiments of the present disclosure. As shown in FIG. 23, the portable terminal 80B includes a terminal controller 81B instead of the terminal controller 81. Further, the portable terminal 80B includes a first image acquisition unit 811B, an information acquisition unit 812B, an image position acquisition unit 813B, a second image acquisition unit 814B, and a display controller 815. In the terminal controller 81B shown in FIG. 23, the same configurations as those of the terminal controller 81 shown in FIG. 9 are denoted by the same reference numerals, and the description thereof will be omitted or simplified.

The first image acquisition unit 811B may be configured to acquire at least one of the aerial image, the composite image, and the downward-facing image from at least one of the plurality of UAVs 100B through the interface unit 82 or the wireless communication circuit 85. The images acquired by the first image acquisition unit 811B may be transmitted to the portable terminal 80B as a representative of one UAV 100B belonging to the flight group, or the images may be separately transmitted to the portable terminal 80B by the respective UAVs 100B.

The information acquisition unit 812B may be configured to acquire at least one of the at least a portion of the flight related information or the at least a portion of the imaging related information of the imaging devices 220 and 235 through the interface unit 82 or the wireless communication circuit 85. The information acquired by the fi information acquisition unit 812B may be transmitted to the portable terminal 80B as a representative of one UAV 100B belonging to the flight group, or the information may be transmitted to the portable terminal 80B by the respective UAVs 100B. In addition, the information acquisition unit 812B may be configured to acquire the relative position information between the plurality of UAVs 100B belonging to the flight group through the interface unit 82 or the wireless communication circuit 85.

The image position acquisition unit 813B may be configured to acquire the image position information corresponding to the position of the UAV 100B (e.g., the local aircraft) in the downward-facing image (which may include one aerial image and the composite image). In one embodiment, the image position acquisition unit 813B may calculate the image position information of the UAV 100B (e.g., the local aircraft) based on the inclination of the imaging devices 220 and 235 with respect to the direction of gravity. In another embodiment, the image position acquisition unit 813B may calculate the image position information of the UAV 100B (e.g., the local aircraft) based on the inclination of the imaging devices 220 and 235 with respect to the direction of gravity, and the viewing angle of the imaging devices 220 and 235.

The image position acquisition unit 813B may be configured to acquire the image position information corresponding to the position of the other UAVs 100B (e.g., the other aircrafts) in the downward-facing image. In one embodiment, the image position acquisition unit 813B may calculate and obtain the image position information corresponding to the position of the other UAVs 100B (e.g., the other aircrafts) based on the acquired position information of one UAV 100B (e.g., the local aircraft) and the acquired relative position information. In another embodiment, the image position acquisition unit 813B may calculate and obtain the image position information corresponding to the position of the other UAVs 100B (e.g., the other aircrafts) based on the acquired information of all the UAVs 100B belonging to the flight group.

The second image acquisition unit 814B may be used to superimpose the related information of each of the UAVs 100B at each image position corresponding to the position of each of the UAVs 100B in the downward-facing image, and generate a superimposed image. The information related to each of the UAVs 100B may be the same as the information described in the embodiments above.

As described in the previous embodiments, the portable terminal 80B and the UAV 100B may acquire the image position information of each of the plurality of UAVs 100B based on the relative position information. As such, the portable terminal 80B and the UAV 100B may express the relative position information of the plurality of UAVs 100B by displaying images of the respective UAVs 100B. Further, it may be sufficient to acquire at least one piece of the relative position information. As such, the amount of communication between the plurality of UAVs 100B and the portable terminal 80B may be reduced. The operator may visually confirm the superimposed image on the display unit 88, thereby confirming the relative positional relationship of the plurality of UAVs 100B, and determining the formation the plurality of UAVs 100B in the coordinated flight may be flying.

In addition, the portable terminal 80B and the UAV 100B may acquire the image position information of each of the plurality of UAVs 100B based on the position information of each of the plurality of UAVs 100B. As such, the portable terminal 80B and the UAV 100B may accurately derive the image position corresponding to the position of each of the UAVs 100B by using the absolute position information of each of the plurality of UAVs 100B. Further, the operator may check the superimposed image on the display unit 88, check the image positions of the plurality of UAVs 100B, and accurately estimate the flight position in the actual space corresponding to each image position. As such, the operator may determine with high precision the formation of the plurality of UAVs 100B in the coordinated flight may be flying.

The superimposed image of the present embodiment will be described below.

Figure 24:
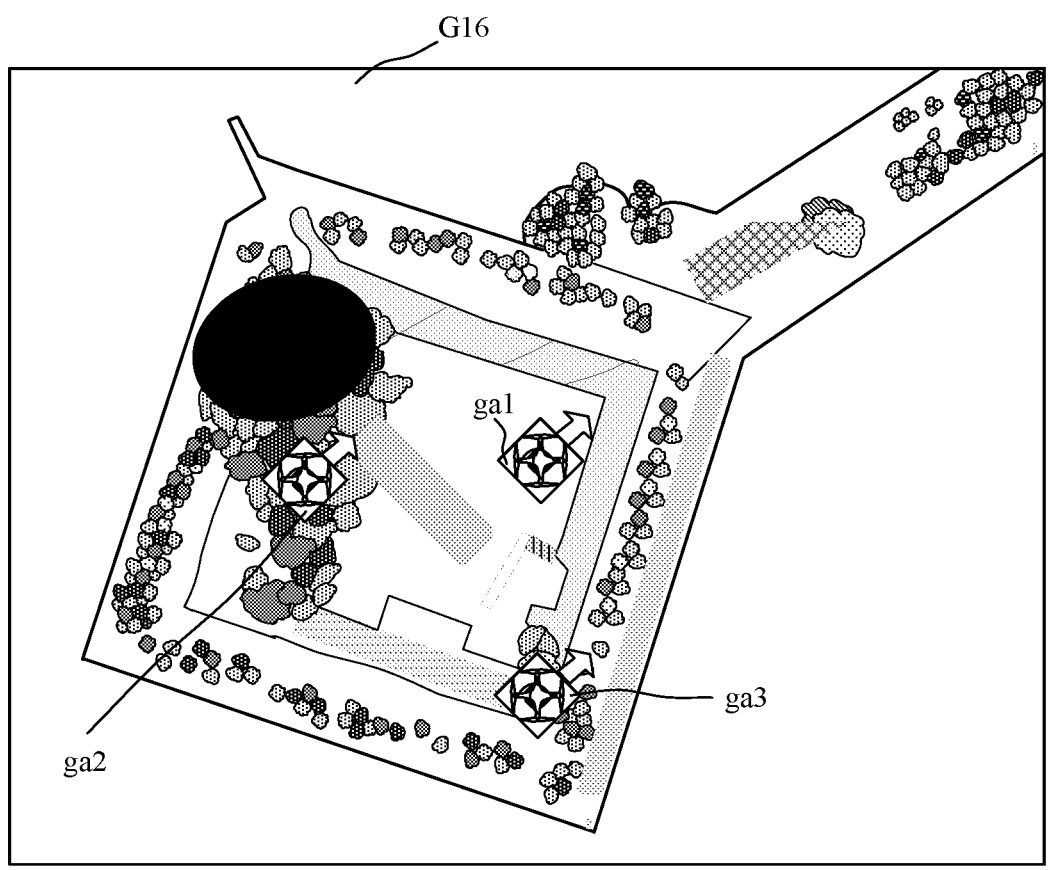
FIG. 24 is a diagram illustrating an example of a superimposed image of related information on which a plurality of UAVs are superimposed.

FIG. 24 is a diagram illustrating an example of a superimposed image G16 on which the related information of a plurality of UAVs 100B are superimposed. In FIG. 24, images ga1, ga2, and ga3 indicating the respective UAVs 100B are superimposed. The three UAVs 100B are merely an example, and the number of UAVs are not limited in the present disclosure. In addition, an image (arrow image or the like) indicating the related information of each of the UAVs 100B may be superimposed on the superimposed image G16.

As described in the previous embodiments, the image position acquisition unit 813B may be configured to acquire the image position information of each of the plurality of UAVs 100B in the downward-facing image by calculation or the like. The second image acquisition unit 814 may be used to superimpose the images ga1-ga3 indicating the respective pieces of information of the plurality of UAVs 100B in the image positions of the plurality of UAVs 100B in the downward-facing image to generate the superimposed image G16.

The portable terminal 80B and the flight system 10B may display the superimposed image including the related information of each UAV 100 in each image position corresponding to each position of the plurality of UAVs 100B in the downward-facing image (which may include an aerial image or a composite image). Therefore, by checking the displayed superimposed image, the operator may determine that the plurality of UAVs 100B may be flying at the actual spatial position corresponding to the image position in the downward-facing image. In addition, the operator may identify the formation that the plurality of UAVs 100B may be arranged in a plane. As such, the operator may easily control the plurality of UAVs 100B to fly to a desired position by using the transmitter 50 while checking the downward-facing image. Further, even if the map image is not prepared in advance, it may be easy to determine at which position the plurality of UAVs 100B may be flying.

In the present embodiment, the plurality of UAVs 100B may maintain a relative positional relationship of different flight heights and fly. For example, the plurality of UAVs 100B may be used to perform a coordinated flight, and at least one other UAV 100 may enter the imaging range in which one of the plurality of UAVs 100B may be imaging towards the ground direction. As such, the flight system 10B may include the actual flight conditions of at least one UAV 100B in the aerial image, and the image of the UAV 100B may be superimposed in an actual size in the actual image position in the aerial image.

In some embodiments, the functions of the flight system 10B may be distributed between the UAV 100B and the portable terminal 80B. For example, the UAV 100B may be used to perform the image processing such as the generation of the composite image, the generation of the downward-facing image, the determination of the image position of each of the UAVs 100B, the generation of the superimposed image, and the like. In addition, the portable terminal 80B may be configured to receive the superimposed image from the UAV 100B and display the superimposed image. In some embodiments, the functions of the flight system 10B may be distributed between the UAV 100B and the portable terminal 80B in another manner.

In some embodiments, an image DB may be stored in the portable terminal, which may be a device other than the UAV. The image DB may be used to store the aerial images captured by the UAV.

Figure 25:
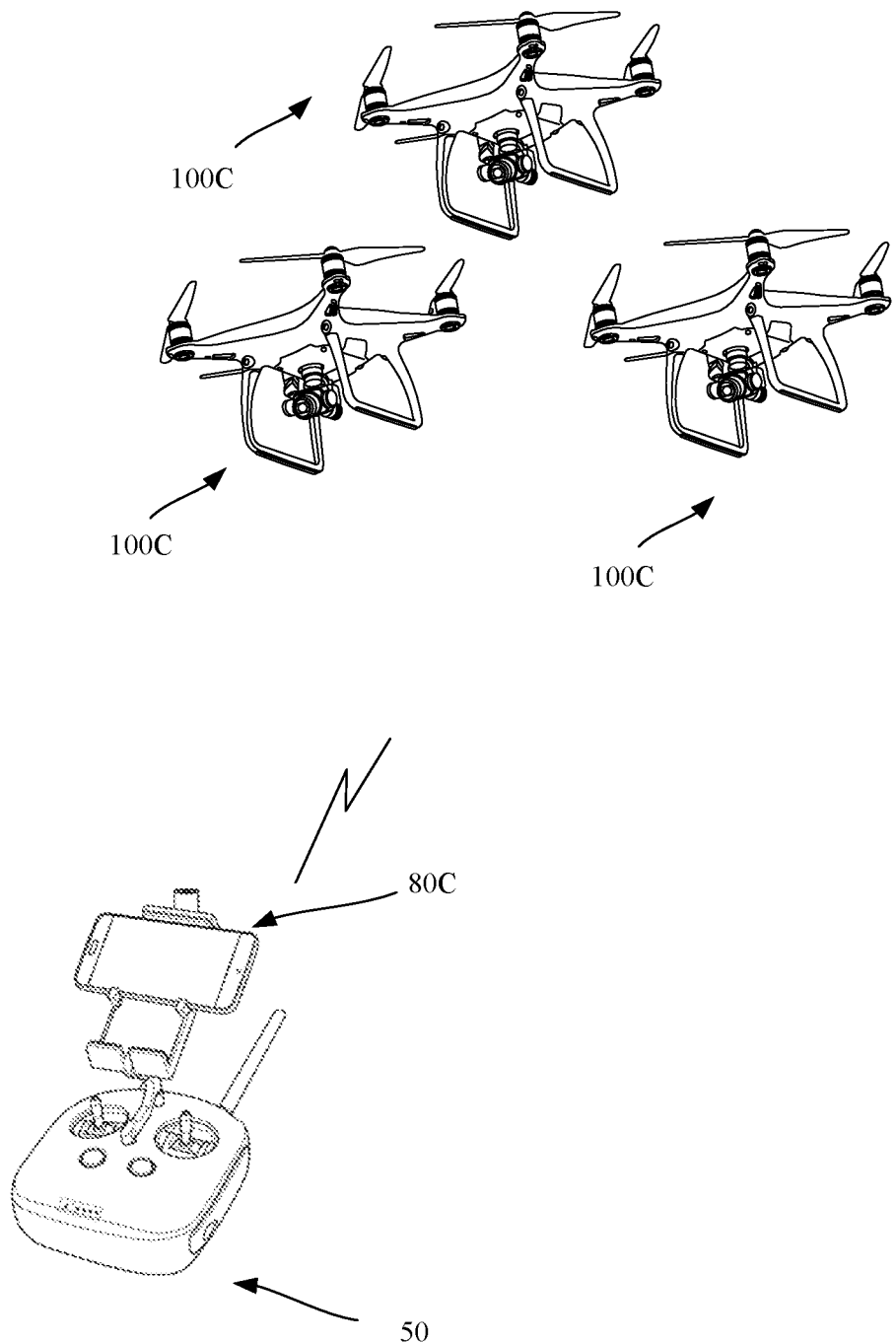
FIG. 25 is a diagram illustrating an example configuration of a flight system according to another embodiment of the present disclosure.

FIG. 25 is a diagram illustrating an example configuration of a flight system 10C consistent with embodiments of the present disclosure. As shown in FIG. 25, the flight system 10C includes a plurality of UAVs 100C, a transmitter 50, and a portable terminal 80C. The UAV 100C, the transmitter 50, and the portable terminal 80B may communicate with each other by wired communication or wireless communication (e.g., a wireless LAN). In the embodiments described below, the same configurations and operations as those of the embodiments described above are omitted or simplified.

Hardware configuration of the UAV 100C is not shown in the figures. The UAV 100C may include one or more of the components of the UAV 100, 100A, or 100B described above. In some embodiments, the UAV 100C may not include the memory 170 and the image DB 171 included in the UAV 100, 100A, and 100B. In addition, the UAV 100C may not include a function related to the image input/output control of the image DB 171, such as the storing of an aerial image to the image DB 171, the extracting of an aerial image from the image DB 171, or the like. The other configurations of the UAV 100C may be the same as the UAV 100, 100A, and 100B.

The communication interface 150 of the UAV 100C may be used to transmit a generation request of the superimposed image to the portable terminal 80C. The generation request of the superimposed image may include the aerial image captured by the imaging devices 220 and 235 of the UAV 100C, and detailed position information of the UAV 100C and the inclination information of the imaging devices 220 and 235 at the time of the aerial imaging. The generation request of the superimposed image may further include the relative position information of the plurality of UAVs 100C belonging to the flight group. In one embodiment, the generation request of the superimposed image may further include the identification information of the UAV 100C that may be required to generate the superimposed image. In addition, the generation request of the superimposed image may not include the aerial image, but include the position information of the UAV 100C when the superimposed image is required to be generated, and the inclination information of the imaging devices 220 and 235.

Figure 26:
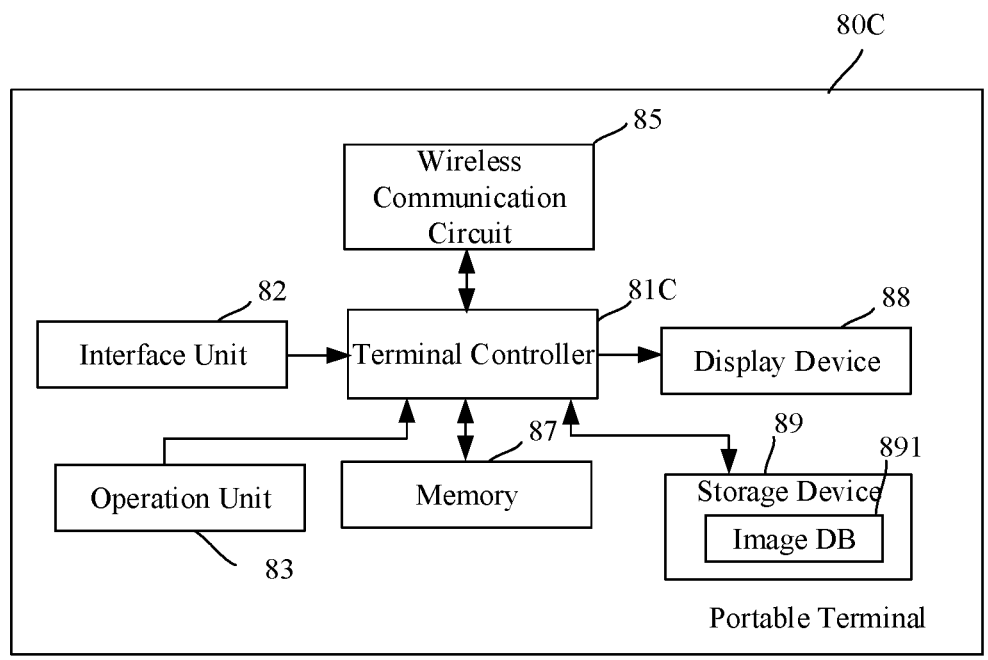
FIG. 26 is a block diagram illustrating an example hardware configuration of a portable terminal according to an embodiment of the present disclosure.

FIG. 26 is a block diagram illustrating an example hardware configuration of the portable terminal 80C consistent with embodiments of the present disclosure. As shown in FIG. 26, the portable terminal 80C includes a terminal controller 81C instead of the terminal controller 81, and portable terminal 80C additionally includes a storage device 89. The storage device 89 includes an image DB 891. Other configurations of the portable terminal 80C may be the same as the portable device 80, 80A, 80B.

The storage device 89 may be used to save and store various data and information, and it includes the image DB 891. The storage device 89 may be an HDD, an SSD, an SD card, a USB memory, or the like. Further, the storage device 89 may be disposed inside the portable terminal 80C, or it may be disposed to be detachable from the portable terminal 80C.

The image DB 891 may be configured to save and store various images and their additional information acquired by the interface unit 82 or the wireless communication circuit 85, where the images may include aerial images transmitted from one or more UAVs 100C. The additional information may include the information related to the flight of the UAV 100C associated with the transmitted aerial images, or information related to the imaging devices 220 and 235. The image DB 891 may be configured to transmit at least a part of the stored aerial image to the terminal controller 81 based on a request from the terminal controller 81C. In one embodiment, the image DB 891 may be configured to save and store the processed images of the processed aerial images. In one embodiment, the image DB 891 may be configured to save and store in a state in which the related information of the aerial images or the processed images may be added to the aerial images or the processed images.

In one embodiment, the image DB 891 may be configured to distinguish and store images and additional information from the plurality of UAVs 100C. For example, a plurality of image DB 891 may be separately arranged for each of the UAVs 100C. Further, the images and the additional information from the plurality of UAVs 100C may be stored in one image DB 891, and the images and the additional information from a specific UAV 100C may be extracted and used based on the identification information of the UAV 100C.

In one embodiment, the image DB 891 may be configured to store images and additional information from the plurality of UAVs 100C without distinguishing them. As such, the flight system 10C may share the images and the additional information from the plurality of UAVs 100C.

Figure 27:
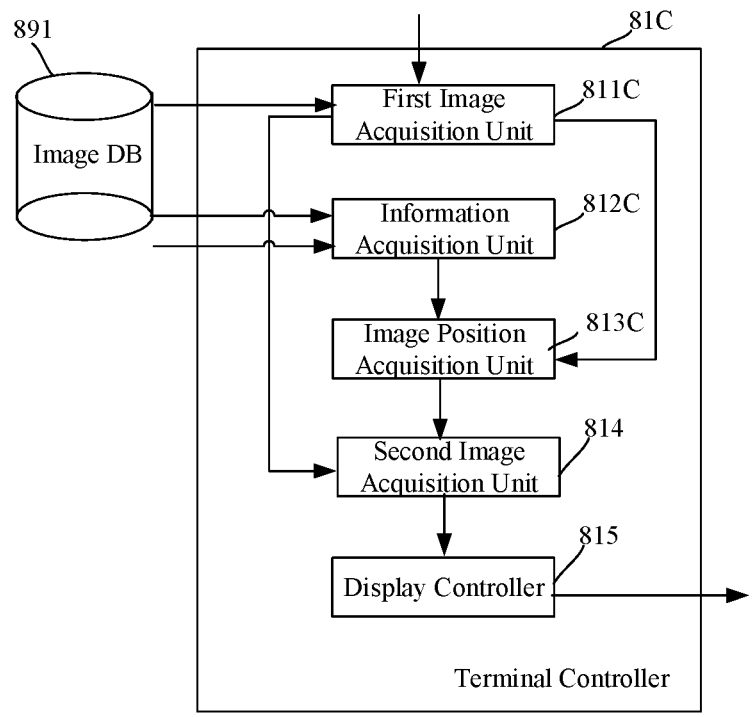
FIG. 27 is a block diagram illustrating an example functional configuration of the portable terminal according to an embodiment of the present disclosure.

FIG. 27 is a block diagram illustrating an example functional configuration of the portable terminal 80C consistent with embodiments of the present disclosure. As shown in FIG. 27, the terminal controller 81C includes a first image acquisition unit 811C, an information acquisition unit 812C, an image position acquisition unit 813C, a second image acquisition unit 814, and a display controller 815.

The first image acquisition unit 811C may include the following functions in addition to the functions of the first image acquisition unit 811 or 811B. The first image acquisition unit 811C may be configured to acquire one or more aerial images from one or more UAVs 100C through the interface unit 82 or the wireless communication circuit 85. In one embodiment, the first image acquisition unit 811C may be configured to acquire one or more aerial images from one or more UAVs 100C from the image DB 891. Further, the first image acquisition unit 811C may be configured to acquire the aerial images from the image DB 891 based on the generation request of the superimposed image from an arbitrary UAV 100C acquired through the interface unit 82 or the wireless communication circuit 85. As such, the first image acquisition unit 811C may be configured to acquire, for example, aerial images of a predetermined area (e.g., a peripheral area) regarding a position related to the position information of the UAV 100C from the image DB 891 based on the position information of the UAV 100C included in the generation request of the superimposed image.

The first image acquisition unit 811C may be configured to generate the composite image based on the acquired plurality of aerial images. Further, the first image acquisition unit 811C may be configured to generate the downward-facing image based on the aerial images or the composite image. As such, the first image acquisition unit 811C may be used to perform the projective transformation on the aerial images or the composite image to generate the downward-facing image based on the inclination information of the imaging devices 220 and 235 of the UAV 100C included in the generation request of the superimposed image.

The information acquisition unit 812C may include the following functions in addition to the functions of the information acquisition unit 812 or 812B. The information acquisition unit 812C may be configured to acquire additional information related to the aerial images acquired by the first image acquisition unit 811C through the interface unit 82 or the wireless communication circuit 85. In one embodiment, the information acquisition unit 812C may be configured to acquire the additional information related to the aerial images acquired by the first image acquisition unit 811C from the image DB 891. Further, the information acquisition unit 812C may be configured to acquire the identification information of the UAV 100C that requested the generation of the superimposed image through the interface unit 82 or the wireless communication circuit 85. Furthermore, the information acquisition unit 812C may be configured to acquire the relative position information between the plurality of UAVs 100C through the interface unit 82 or the wireless communication circuit 85.

The image position acquisition unit 813C may include the functions of the image position acquisition unit 813 or 813B.

An example of the operation of the flight system 10C will be described below.

Figure 28:
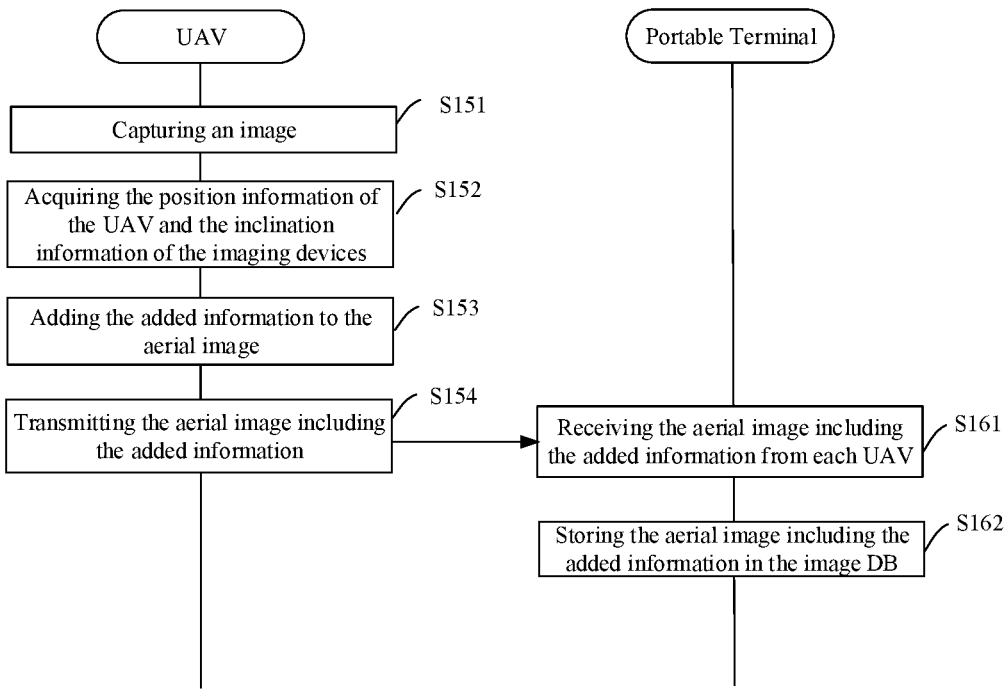
FIG. 28 is a flowchart illustrating an example operation of the flight system according to an embodiment of the present disclosure.

FIG. 28 is a flowchart illustrating an example operation of the flight system 10C consistent with embodiments of the present disclosure. In the example operation shown in FIG. 28, the flight system 10C may be used to store aerial images from the plurality of UAVs 100C in the portable terminal 80C. The aerial image may be stored every time the aerial image is taken, summarized and stored a predetermined number of aerial images after a predetermined number of image captures, or summarized and stored at predetermine time intervals, where the time interval for capturing the aerial images may be arbitrary.

At each of the UAVs 100C, the first image acquisition unit 113 acquires the aerial images captured by the imaging devices 220 and 235 (S151). The flight information acquisition unit 111 acquires the position information of the UAV 100C (S152). The position information may be the position information of each of the UAVs 100C when the aerial images are captured in S151. The imaging information acquisition unit 112 acquires the inclination information of the imaging devices 220 and 235 (S152). The inclination information may be the inclination information of the imaging devices 220 and 235 when the aerial images are captured in S121.

The information adding unit 114 adds the position information of the UAV 100C acquired in S152 and the inclination information of the imaging devices 220 and 235 to the aerial images acquired in S151 as the additional information related to the aerial images (S153). Further, the communication interface 150 transmits the aerial images including the additional information to the portable terminal 80C (S154).

At the portable terminal 80C, the interface unit 82 or the wireless communication circuit 85 receives the aerial images including the additional information from the plurality of UAVs 100C (S161). Further, the interface unit 82 or the wireless communication circuit 85 stores the received aerial images including the additional information in the image DB 891 (S162).

Based on the example operation shown in FIG. 28, the portable terminal 80C may associate and store the aerial images captured by each of the plurality of UAVs 100C with the related additional information of the aerial image. As such, even if the aerial images are not processed after the aerial images are captured, each of the UAVs 100C may still request the portable terminal 80C to extract at least one piece of additional information as a keyword, and extract the aerial images associated with the additional information. As such, portable terminal 80C may extract, for example, the aerial images that match the flight position of the UAV 100C including the generation request of the superimposed image, and use the aerial images as the original images for generating the downward-facing image.

Figure 29:
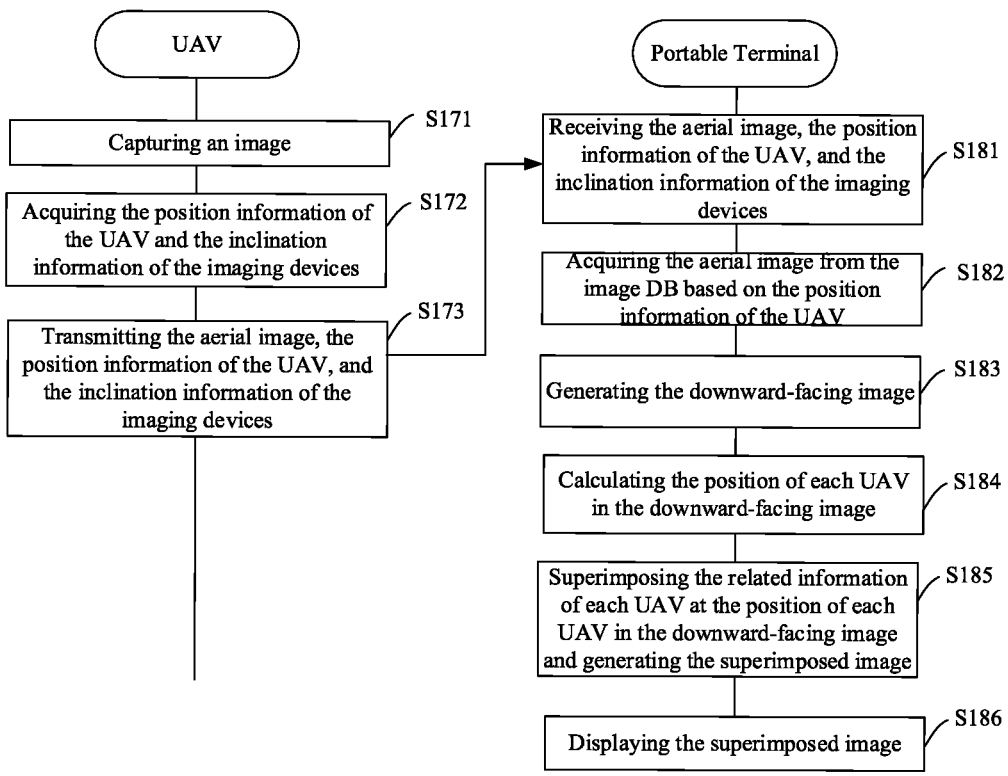
FIG. 29 is a flowchart illustrating another example operation of the flight system according to another embodiment of the present disclosure.

FIG. 29 is a flowchart illustrating another example operation of the flight system 10C consistent with embodiments of the present disclosure. In the example operation shown in FIG. 29, the flight system 10C may not include the image position corresponding to the actual spatial position of the UAV 100C within the aerial image captured by the UAV 100C that requested the generation of the superimposed image. In addition, when the image position corresponding to the actual spatial position of the UAV 100C is included in the aerial image captured by the UAV 100C that requested the generation of the superimposed image, the flight system 10C may still implement the example operation of FIG. 29. Further, the example operation of FIG. 29 may be implemented periodically and repeatedly during the flight of the UAV 100C.

At any UAV 100C, the first image acquisition unit 113 acquires the aerial image captured by the imaging devices 220 and 235 (S171). The flight information acquisition unit 111 acquires the position information of the UAV 100C (S172). The position information may be the position information of the UAV 100C when the aerial image is captured in S171. The imaging information acquisition unit 112 acquires the inclination information of the imaging devices 220 and 235 (S172). The communication interface 150 adds the aerial image acquired in S171 and S172, the position information of the UAV 100C, and the inclination information of the imaging devices 220 and 235 into the generation request of the superimposed image, and transmits it to the portable terminal 80C (S173).

At the portable terminal 80, the first image acquisition unit 811C receives the aerial image included in the generation request of the superimposed image from the UAV 100C through the interface unit 82 or the wireless communication circuit 85 (S181). The information acquisition unit 812 receives the position information of the UAV 100C and the inclination information of the imaging devices 220 and 235 included in the generation request of the superimposed image from the UAV 100C through the interface unit 82 or the wireless communication circuit 85 (S141).

The first image acquisition unit 811C acquires one or more aerial images from the image DB 891 based on the position information of the UAV 100C included in the generation request of the superimposed image. Further, the first image acquisition unit 811C performs processing such as the projective transformation on one or more aerial images based on the inclination information added to each of the acquired one or more aerial images, and generates one or more downward-facing images (S183). In one embodiment, the first image acquisition unit 811C may combine the plurality of generated downward-facing images to generate one downward-facing image (S183).

At S183, the first image acquisition unit 811C may generate a downward-facing image based on one aerial image acquired in S181, one or more aerial images acquired from the image DB 891, and the inclination information of the imaging devices 220 and 235 associated with the aerial images, respectively.

The image position acquisition unit 813C calculates the image position corresponding to the position of the UAV 100C in the downward-facing image (S184). The image position of the UAV 100C may include at least the image position of the UAV 100C that requested the generation of the superimposed image. Further, the image position of the UAV 100C may include an image position of the UAV 100C other than the UAV 100C that requested the generation of the superimposed image. In this case, the image position acquisition unit 813C may calculate the image position information of the plurality of UAVs 100C based on the position information of the UAV 100C that requested the generation of the superimposed image and the relative position information of the plurality of UAVs 100C. In addition, in this case, the image position acquisition unit 813C may calculate the image position information of the plurality of UAVs 100C based on the position information of all the UAVs 100C belonging to the flight group. In one embodiment, the position information of each of the UAVs 100C at the time of capturing the aerial image included in the generation request of the superimposed image may be acquired from each of the UAVs 100C.

The second image acquisition unit 814 superimposes one or more pieces of the related information (e.g., one or more of images ga, gb, gc, and gd) of one or more UAVs 100C at one or more image positions of the downward-facing image to generate the superimposed image (S185). The display controller 815 displays the superimposed image on the display unit 88 (S186).

Based on the example operation of FIG. 29, the portable terminal 80C and the flight system 10C may display the superimposed image including the related information of each of the UAVs 100C in each image position corresponding to the actual spatial position of each of the UAVs 100C in the downward-facing image. Therefore, by confirming the displayed superimposed image, the operator may recognize that each of the UAVs 100C may be flying at the actual spatial position corresponding to the image position in the downward-facing image. As such, it may be easy for the operator to fly the UAV 100C to a desired position by using the transmitter 50 while confirming the downward-facing image. In addition, even if the map image is not prepared in advance, it may be easy to identify the position at which the UAV 100C may be flying.

In addition, the portable terminal 80C and the flight system 10C may store the aerial images captured by the plurality of UAVs 100C in the image DB 891 in batch, and share and use them based on the generation request of the superimposed image from the respective UAVs 100C. As such, for example, for a flight range in which a certain UAV 100C may be flying for the first time, and the UAV 100C has not separately stored the past aerial images, a composite image or a downward-facing image may be generated based on the aerial images of other UAVs 100C that has previously stored in the image DB 891.

In some embodiments, an image DB may be stored in an image server other than the UAV, and the image DB may be used to store the aerial images captured by the UAV.

Figure 30:
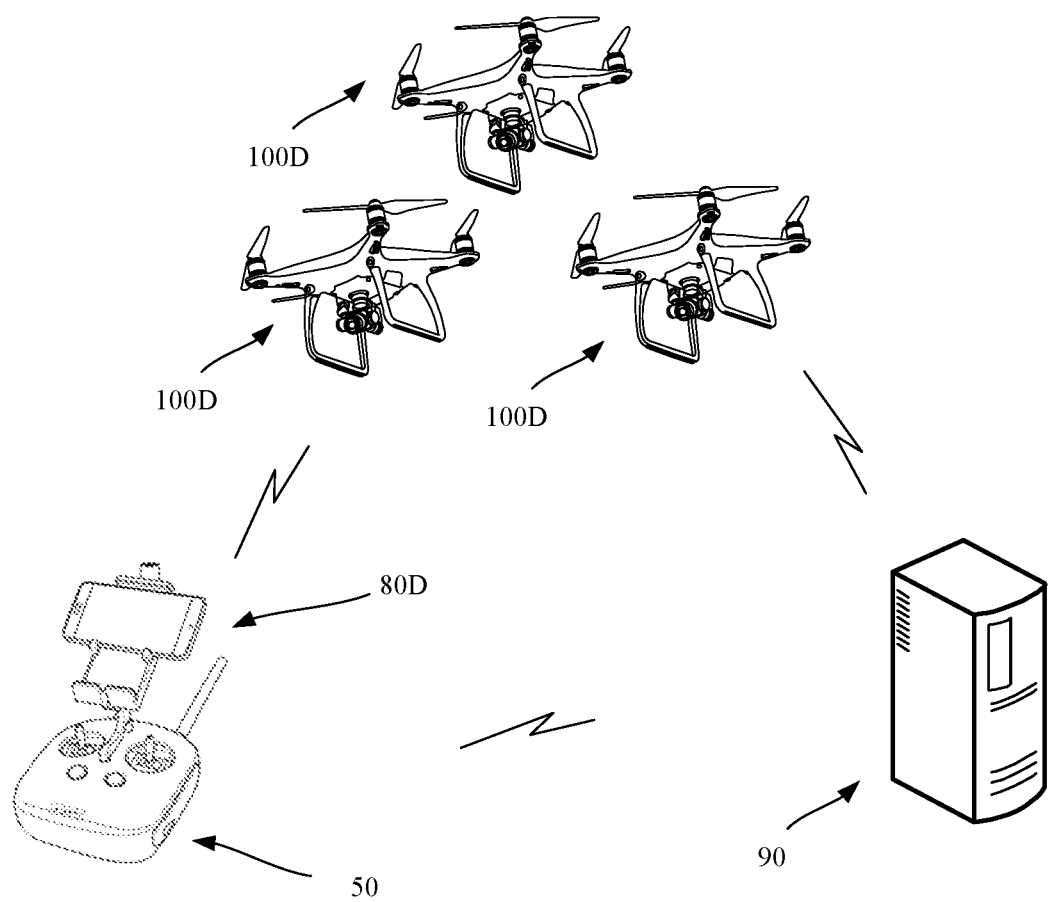
FIG. 30 is a diagram illustrating an example configuration of a flight system according to another embodiment of the present disclosure.

FIG. 30 is a diagram illustrating an example configuration of a flight system 10D consistent with embodiments of the present disclosure. As shown in FIG. 30, the flight system 10D includes a plurality of UAVs 100D, a transmitter 50, a portable terminal 80D, and an image server 90. The UAV 100D, the transmitter 50, the portable terminal 80D, and the image server 90 may communicate with each other by wired communication or wireless communication. In the embodiments described below, the same configurations and operations as those of the embodiments described above are omitted or simplified.

The UAV 100D is not shown, but it may include the same configuration as the UAV 100C. In addition, the communication interface 150 may issue a request for generating the superimposed image to the image server 90 instead of issuing a request to the portable terminal 80D. In one embodiment, the communication interface 150 may issue a request for generating the superimposed image to the image server 90 through the portable terminal 80D.

The portable terminal 80D is not shown, but it may include the same configuration as the portable terminal 80 or 80B. In one embodiment, the portable terminal 80D may include at least a display function.

Figure 31:
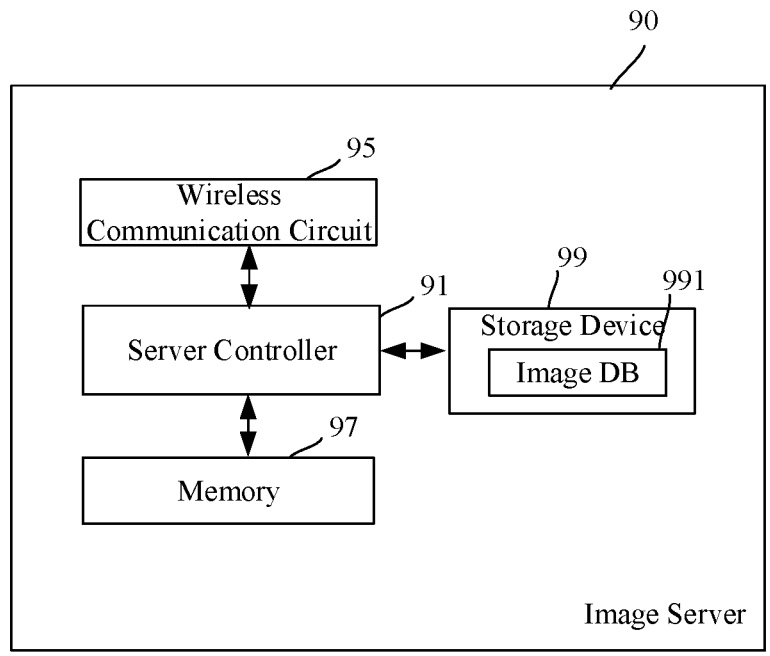
FIG. 31 is a block diagram illustrating an example hardware configuration of an image server according to an embodiment of the present disclosure.

FIG. 31 is a block diagram illustrating an example hardware configuration of the image server 90 consistent with embodiments of the present disclosure. As shown in FIG. 30, the image server 90 includes a server controller 91, a wireless communication circuit 95, a memory 97, and a storage device 99.

The server controller 91 may include, for example, a CPU, a MPU, or a DSP. The server controller 91 may be used to perform the signal processing for the overall control of the operation of each of part of the image server 90, input/output processing of data with other parts, arithmetic processing of data, and storage processing of data.

The server controller 91 may be configured to acquire information and data form the UAV 100D through the wireless communication circuit 95. In one embodiment, the server controller 91 may be configured to acquire information and data stored in the memory 97. The server controller 91 may be used to transmit information and data to the portable terminal 80D, and display the display information based on the information and data on the display unit 88.

The wireless communication circuit 95 may communicate with the UAV 100D and the portable terminal 80D through various wireless communication means, such as, for example, a communication via a wireless LAN, Bluetooth, or a public wireless connection.

The memory 97 may include, for example, a ROM that may be used to store data specifying a program and a set of value for the operation of the image server 90, and/or a RAM that may be used for temporarily storing various types of data and information when the server controller 91 performs processing. In one embodiment, the memory 97 may include memories other than the ROM and the RAM. Further, the memory 97 may be disposed inside the image server 90. In some embodiments, the memory 97 may be set to be detachable from the image server 90. In some embodiments, the program may include an application.

The storage device 99 may be used to save and store various information and data, and the storage device 99 may include an image DB 991. The storage device 99 may be an HDD, an SSD, an SD card, a USB memory, or the like. Further, the storage device 89 may be disposed inside the image server 90, or it may be disposed to be detachable from the image server 90.

The image DB 991 may be configured to save and store various images and their additional information acquired through the wireless communication circuit 95. The images may include aerial images transmitted from one or more UAVs 100D. The additional information may include the information related to the flight of the UAV 100D associated with the transmitted aerial images, or information related to the imaging devices 220 and 235. The image DB 991 may be configured to transmit at least a part of the stored aerial image to the server controller 91 based on a request from the server controller 91. In one embodiment, the image DB 991 may be configured to save and store the processed images of the processed aerial images. In one embodiment, the image DB 991 may be configured to save and store in a state in which the related information of the aerial images or the processed images may be added to the aerial images or the processed images.

In one embodiment, the image DB 991 may be configured to distinguish and store images and additional information from the plurality of UAVs 100D. For example, a plurality of image DB 991 may be separately arranged for each of the UAVs 100D. Further, the images and the additional information from the plurality of UAVs 100D may be stored in one image DB 991, and the images and the additional information from a specific UAV 100D may be extracted and used based on the identification information of the UAV 100D.

In one embodiment, the image DB 991 may be configured to store images and additional information from the plurality of UAVs 100D without distinguishing them. As such, the flight system 10D may share the images and the additional information from the plurality of UAVs 100D.

Figure 32:
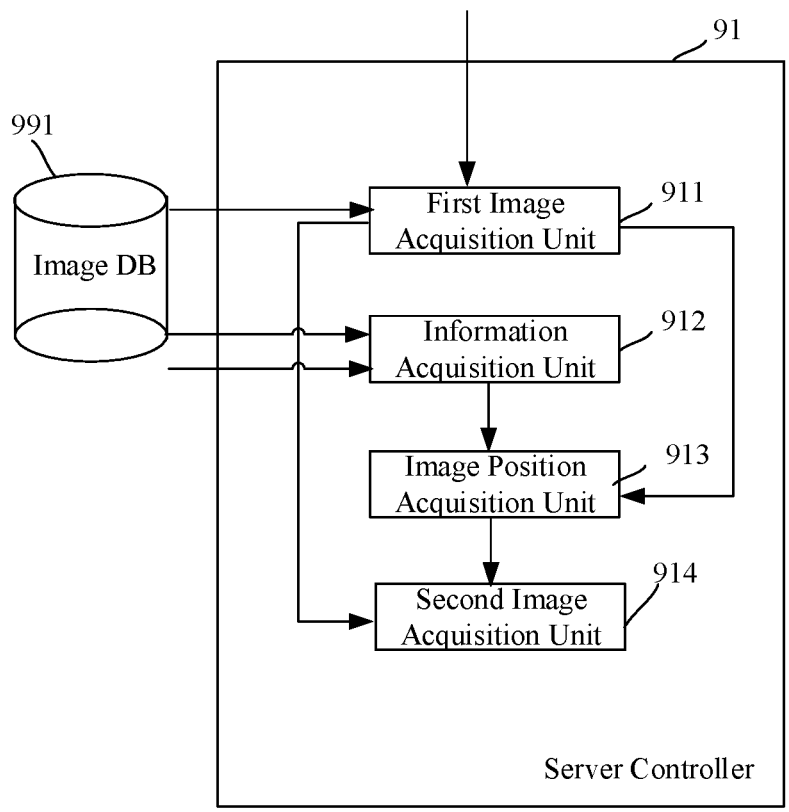
FIG. 32 is a block diagram illustrating an example functional configuration of the image server according to an embodiment of the present disclosure.

FIG. 32 is a block diagram illustrating an example functional configuration of the image server 90 consistent with embodiments of the present disclosure. As shown in FIG. 32, the image server 90 includes a first image acquisition unit 911, an information acquisition unit 912, an image position acquisition unit 913, and a second image acquisition unit 914.

The first image acquisition unit 911 may be configured to acquire one or more aerial images from one or more UAVs 100*d* through the wireless communication circuit 95. In one embodiment, the first image acquisition unit 911 may be configured to acquire one or more aerial images from one or more UAVs 100D from the image DB 991. Further, the first image acquisition unit 911 may be configured to acquire the aerial images from the image DB 991 based on the generation request of the superimposed image from an arbitrary UAV 100D acquired through the wireless communication circuit 95. As such, the first image acquisition unit 911 may be configured to acquire, for example, aerial images of a predetermined area (e.g., a peripheral area) regarding a position related to the position information of the UAV 100D from the image DB 991 based on the position information of the UAV 100D included in the generation request of the superimposed image.

The first image acquisition unit 911 may be configured to generate the composite image based on the acquired plurality of aerial images. Further, the first image acquisition unit 911 may be configured to generate the downward-facing image based on the aerial images or the composite image. As such, the first image acquisition unit 911 may be used to perform the projective transformation on the aerial images or the composite image to generate the downward-facing image based on the inclination information of the imaging devices 220 and 235 of the UAV 100D included in the generation request of the superimposed image.

The information acquisition unit 912 may be configured to acquire additional information related to the aerial images acquired by the first image acquisition unit 911 through the wireless communication circuit 95. In one embodiment, the information acquisition unit 912 may be configured to acquire the additional information related to the aerial images acquired by the first image acquisition unit 911 from the image DB 991. Further, the information acquisition unit 912 may be configured to acquire the identification information of the UAV 100D that requested the generation of the superimposed image through the wireless communication circuit 95. Furthermore, the information acquisition unit 912 may be configured to acquire the relative position information between the plurality of UAVs 100D through the wireless communication circuit 95.

The image position acquisition unit 913 may be configured to acquire the position information corresponding to the position of the UAV 100D in the downward-facing image. The image position acquisition unit 913 may be used to calculate and obtain the image position information based on the inclination of the imaging devices 220 and 235 with respect to the direction of gravity. In some embodiments, the image position acquisition unit 913 be used to calculate and obtain the image position information based on the inclination of the imaging devices 220 and 235 with respect to the direction of gravity and the viewing angle of the imaging devices 220 and 235.

The image position acquisition unit 913 may be configured to acquire the image position information corresponding to the position of the plurality of UAVs 100D in the downward-facing image. In one embodiment, the image position acquisition unit 913 may calculate and obtain the image position information corresponding to the position of each of the UAVs 100D based on the acquired position information of one UAV 100D and the acquired relative position information. In another embodiment, the image position acquisition unit 913 may calculate and obtain the image position information corresponding to the position of each of the UAVs 100D based on the acquired information of all the UAVs 100D belonging to the flight group.

The second image acquisition unit 914 may be used to superimpose the information related to one or more the UAVs 100D at the image position corresponding to the position of one or more UAVs 100D in the downward-facing image, and generate a superimposed image. The information related each of the UAVs 100D may be the same as the information described in the first embodiment.

Examples of the operation of the flight system 10D will be described below.

Figure 33:
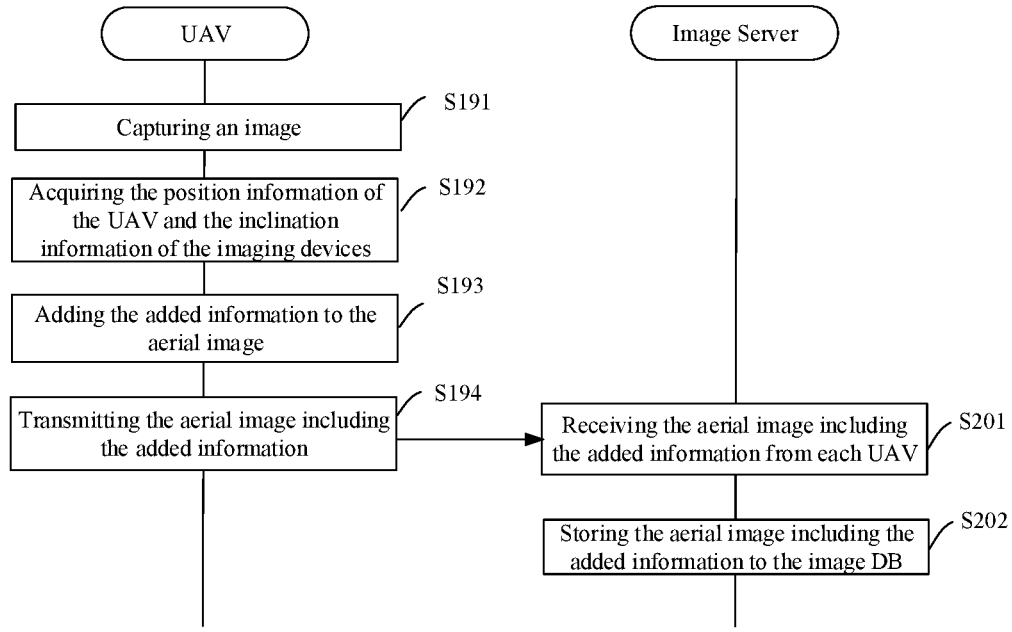
FIG. 33 is a flowchart illustrating an example operation of the flight system according to an embodiment of the present disclosure.

FIG. 33 is a flowchart illustrating an example operation of the flight system 10D consistent with embodiments of the present disclosure.

In the example operation shown in FIG. 33, the flight system 10C may be used to store aerial images from the plurality of UAVs 100D into the image server 90. The aerial image may be stored every time the aerial image is taken, summarized and stored a predetermined number of aerial images after a predetermined number of image captures, or summarized and stored at predetermine time intervals, where the time interval for capturing the aerial images may be arbitrary.

At each of the UAVs 100D, the first image acquisition unit 113 acquires the aerial images captured by the imaging devices 220 and 235 (S191). The flight information acquisition unit 111 acquires the position information of the UAV 100D (S192). The position information may be the position information of each of the UAVs 100D when the aerial images are captured in S191. The imaging information acquisition unit 112 acquires the inclination information of the imaging devices 220 and 235 (S192). The inclination information may be the inclination information of the imaging devices 220 and 235 when the aerial images are captured in S191.

The information adding unit 114 adds the position information of the UAV 100D acquired in S192 and the inclination information of the imaging devices 220 and 235 to the aerial images acquired in S191 as the additional information related to the aerial images (S193). Further, the communication interface 150 transmits the aerial images including the additional information to the image server 90 (S194).

At the image server 90, the wireless communication circuit 95 receives the aerial images including the additional information from the plurality of UAVs 100D (S201). Further, the wireless communication circuit 95 stores the received aerial images including the additional information in the image DB 991 (S202).

Based on the example operation of FIG. 33, the image server 90 may associate and store the aerial images captured by each of the plurality of UAVs 100D with the related additional information of the aerial image. As such, even if the aerial images are not processed after the aerial images are captured, each of the UAVs 100D may still request the image server 90 to extract at least one piece of additional information as a keyword, and extract the aerial images associated with the additional information. As such, image server 90 may extract, for example, the aerial images that match the flight position of the UAV 100D including the generation request of the superimposed image, and use the aerial images as the original images for generating the downward-facing image.

Figure 34:
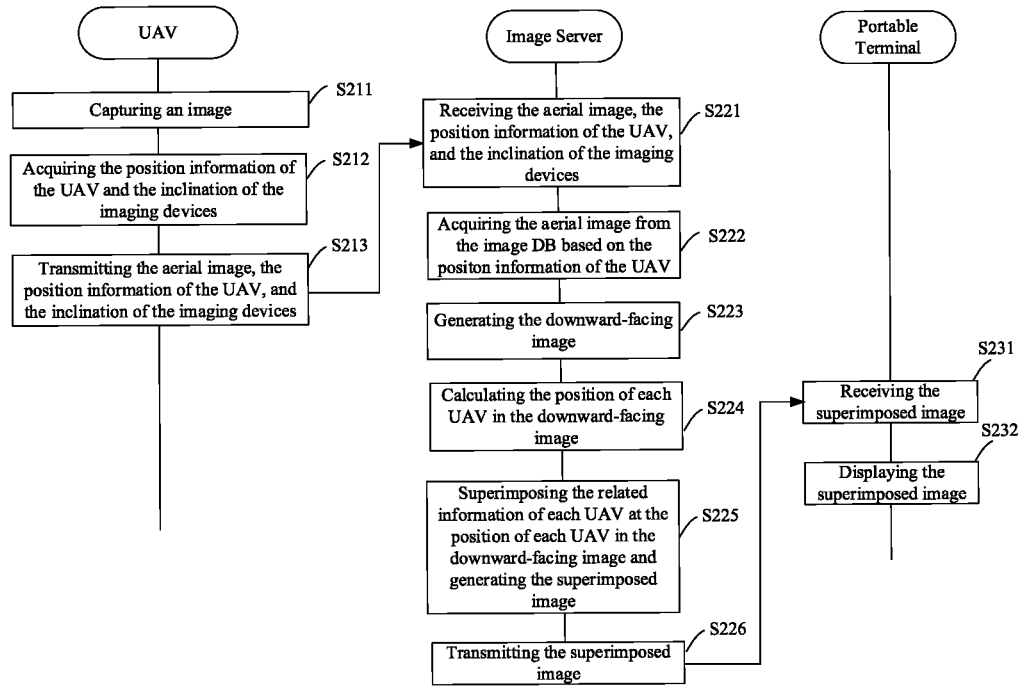
FIG. 34 is a flowchart illustrating another example operation of the flight system according to another embodiment of the present disclosure.

FIG. 34 is a flowchart illustrating another example operation of the flight system 10D consistent with embodiments of the present disclosure. In the example operation shown in FIG. 34, the flight system 10D may not include the image position corresponding to the actual spatial position of the UAV 100D within the aerial image captured by the UAV 100D that requested the generation of the superimposed image. In addition, when the image position corresponding to the actual spatial position of the UAV 100D is included in the aerial image captured by the UAV 100D that requested the generation of the superimposed image, the flight system 10D may still implement the example operation of FIG. 34. Further, the example operation of FIG. 34 may be implemented periodically and repeatedly during the flight of the UAV 100D.

At any UAV 100D, the first image acquisition unit 113 acquires the aerial image captured by the imaging devices 220 and 235 (S211). The flight information acquisition unit 111 acquires the position information of the UAV 100D (S212). The position information may be the position information of the UAV 100D when the aerial image is captured in S211. The imaging information acquisition unit 112 acquires the inclination information of the imaging devices 220 and 235 (S212). The inclination information may be the inclination of the imaging devices 220 and 235 when the aerial image is captured in S211. The communication interface 150 adds the aerial image acquired in S171 and S172, the position information of the UAV 100D, and the inclination information of the imaging devices 220 and 235 into the generation request of the superimposed image, and transmits it to the image server 90 (S213).

At the image server 90, the first image acquisition unit 911 receives the aerial image included in the generation request of the superimposed image from the UAV 100D through the wireless communication circuit 95 (S221). The information acquisition unit 912 receives the position information of the UAV 100D and the inclination information of the imaging devices 220 and 235 included in the generation request of the superimposed image from the UAV 100D through the wireless communication circuit 95 (S221).

The first image acquisition unit 911 acquires one or more aerial images from the image DB 991 based on the position information of the UAV 100D included in the generation request of the superimposed image (S222). Further, the first image acquisition unit 911 sperform processing such as the projective transformation on one or more aerial images based on the inclination information added to each of the acquired one or more aerial images, and generate one or more downward-facing images (S223). In one embodiment, the first image acquisition unit 911 combines the plurality of generated downward-facing images to generate one downward-facing image (S223).

At S223, the first image acquisition unit 911 may generate a downward-facing image based on one aerial image acquired in S221, one or more aerial images acquired from the image DB 991, and the inclination information of the imaging devices 220 and 235 associated with the aerial images, respectively.

The image position acquisition unit 913 calculates the image position corresponding to the position of the UAV 100D in the downward-facing image (S224). The image position of the UAV 100D may include at least the image position of the UAV 100D that requested the generation of the superimposed image. Further, the image position of the UAV 100D may include an image position of the UAV 100D other than the UAV 100D that requested the generation of the superimposed image. In this case, the image position acquisition unit 913 may calculate the image position information of the plurality of UAVs 100D based on the position information of the UAV 100D that requested the generation of the superimposed image and the relative position information of the plurality of UAVs 100D. In addition, in this case, the image position acquisition unit 913 may calculate the image position information of the plurality of UAVs 100D based on the position information of all the UAVs 100D belonging to the flight group. In one embodiment, the position information of each of the UAVs 100D at the time of capturing the aerial image included in the generation request of the superimposed image may be acquired from each of the UAVs 100D.

The second image acquisition unit 914 superimposes one or more pieces of the related information (e.g., one or more of images ga, gb, gc, and gd) of one or more UAVs 100D at one or more image positions of the downward-facing image to generate the superimposed image (S225). The wireless communication circuit 95 transmits the superimposed image to the portable terminal 80D (S226)

At the portable terminal 80D, the first image acquisition unit 911 receives the superimposed image from the image server 90 through the wireless communication circuit 95 (S231). The display controller 815 displays the superimposed image on the display unit 88 (S232).

Based on the example operation of FIG. 34, the image server 90 and the flight system 10D may display the superimposed image including the related information of each of the UAVs 100D in each image position corresponding to the actual spatial position of each of the UAVs 100D in the downward-facing image. Therefore, by confirming the displayed superimposed image, the operator may recognize that each of the UAVs 100D may be flying at the actual spatial position corresponding to the image position in the downward-facing image. As such, it may be easy for the operator to fly the UAV 100D to a desired position by using the transmitter 50 while confirming the downward-facing image. In addition, even if the map image is not prepared in advance, it may be easy to identify the position at which the UAV 100D may be flying.

In addition, the image server 90 and the flight system 10D may store the aerial images captured by the plurality of UAVs 100D in the image DB 991 in batch, and share and use them based on the generation request of the superimposed image from the respective UAVs 100D. As such, for example, for a flight range in which a certain UAV 100D may be flying for the first time, and the UAV 100D has not separately stored the past aerial images, a composite image or a downward-facing image may be generated based on the aerial images of other UAVs 100D that has previously stored in the image DB 991. Further, the image server 90 may be used to perform the image processing on the aerial images in batch. As such, the processing load of the UAV 100D and the portable terminal 80D may be reduced.

In some embodiments, the functions of the image server 90 may be distributed to the image server 90 and the portable terminal 80D. For example, the image server 90 may focus on storing the images in the image DB 991. The portable terminal 80D may be configured to acquire the desired aerial image from the image DB 991, perform the image processing such as the generation of the composite image, the generation of the downward-facing image, the determination of the image position of each of the UAVs 100D, the generation of the superimposed image, and the like. In some embodiments, the functions may be distributed between the image server 90 and the portable terminal 80D in another manner.

The technical solution of the present disclosure have been described by using the various embodiments mentioned above. However, the technical scope of the present disclosure is not limited to the above-described embodiments. It should be obvious to one skilled in the art that various modifications and improvements may be made to the embodiments. It should also obvious from the scope of claims of the present disclosure that thus modified and improved embodiments are included in the technical scope of the present disclosure.

As long as the "before," "previous," etc. are not specifically stated, and as long as the output of the previous processing is not used in the subsequent processing, the execution order of the processes, sequences, steps, and stages in the devices, systems, programs, and methods illustrated in the claims, the description, and the drawings may be implement in any order. For convenience, the operation flows in the claims, description, and drawing have been described using terms such as "first," "next," etc., however, it does not mean these steps must be implemented in this order.

DESCRIPTION OF THE REFERENCE NUMERALS

10, 10B, 10C, 10D Flight system
50 Transmitter
50B Housing
53L Left control lever
53R Right control lever
61 Transmitter controller
63 Wireless communication circuit
65 Interface unit
80, 80B, 80C, 80D Portable terminal
81, 81B, 81C, 81D Terminal controller
82 Interface unit
83 Operation unit
85 Wireless communication circuit
87 Memory
88 Display unit
89 Storage device
90 Image sever
91 Server controller
95 Wireless communication circuit
97 Memory
99 Storage device
100 UAV
102 UAV body
110, 110A, 110B UAV controller
111 Flight information acquisition unit
112 Imaging information acquisition unit
113, 113B First image acquisition unit
114 Information adding unit
115 Communication interface
116 Second image acquisition unit
117 Relative position acquisition unit
118 Flight controller
150 Communication interface
160 Memory
170 Storage device
171 Image DB
200 Gimbal
210 Rotor mechanism
211 Rotor
212 Driving motor
213 Current sensor
220, 230, 235 Imaging device
240 GPS receiver
250 Inertial measurement unit
260 Magnetic compass
270 Barometric altimeter
280 Ultrasonic sensor
290 Laser measuring instrument
811, 811B, 811C First image acquisition unit
812, 812B, 812C Information acquisition unit
813, 813B, 813C Image position acquisition unit
814, 814B Second image acquisition unit
815 Display controller
816 Image acquisition unit
891 Image DB
911 First image acquisition unit
912 Information acquisition unit
913 Image position acquisition unit
914 Second image acquisition unit
991 Image DB
AN1, AN2 Antenna
B1 Power button
B2 RTH button
L1 Remote state display unit
L2 Remaining battery capacity display unit
OPS Operating member group
G11, G12, G13, G14 Aerial image

What is claimed is:

1. An image display method comprising:
    acquiring an aerial image captured by an imaging device of a flying object during flight of the flying object;
    acquiring a first image based on the aerial image;
    determining an image position of the flying object in the first image, the image position including a horizontal image position, in a horizontal direction of the first image, determined by an inclination of the imaging device, a viewing angle of the image device, and a length of the first image along the horizontal direction;
    acquiring image position information of the flying object corresponding to the image position in the first image;
    superimposing, at the image position in the first image, related information of the flying object onto the first image to generate a second image, including superimposing, at the image position in the first image, an image of the flying object onto the first image; and
    displaying the second image indicative of a location of the flying object and the related information of the flying object.

2. The method of claim 1, further comprising:
    acquiring photographing direction information of the imaging device of the flying object;
    wherein the related information of the flying object includes the photographing direction information.

3. The method of claim 1, further comprising:
    acquiring flight direction information of the flying object;
    wherein the related information of the flying object includes the flight direction information.

4. The method of claim 1, further comprising:
    acquiring inclination information of the imaging device of the flying object with respect to a direction of gravity;

wherein acquiring the image position information includes acquiring the image position information based on the inclination information of the imaging device.

5. The method of claim 1, further comprising:
adding photographing position information of the flying object and inclination information of the imaging device of the flying object to the aerial image, the photographing position information indicating a position of the flying object at a time the aerial image is captured, and the inclination information indicating an inclination of the imaging device at the time the aerial image is captured; and
storing the aerial image in a storage device.

6. The method of claim 1, wherein:
the flying object is one of a plurality of flying objects;
acquiring the image position information includes acquiring image position information of each of the plurality of flying objects in the first image; and
generating the second image includes superimposing respective information of the plurality of flying objects on respective image positions of the plurality of flying objects in the first image to generate the second image.

7. The method of claim 6, wherein:
acquiring the aerial image includes acquiring the aerial image captured by an imaging device of one of the plurality of flying objects; and
acquiring the image position information includes acquiring the image position information of each of the plurality of flying objects in the first image based on relative position information of the plurality of flying objects.

8. The method of claim 6, further comprising:
acquiring respective position information of the plurality of flying objects;
wherein acquiring the image position information includes acquiring the image position information of each of the plurality of flying objects in the first image based on the respective position information of the plurality of flying objects.

9. The method of claim 6,
wherein the aerial image is one of a plurality of aerial images captured by the plurality of flying objects, respectively;
the image display method further comprising:
adding photographing position information of the flying objects and inclination information of imaging devices of the flying objects to the aerial images, respectively, the photographing position information of one flying object indicating a position of the one flying object at a time the corresponding aerial image is captured, and the inclination information of the one flying object indicating an inclination of the imaging device of the one flying object at the time the corresponding aerial image is captured; and
storing the plurality of aerial images in a storage device of a display device configured to display the second image.

10. The method of claim 6,
wherein the aerial image is one of a plurality of aerial images captured by the plurality of flying objects, respectively;
the image display method further comprising:
adding photographing position information of the flying objects and inclination information of imaging devices of the flying objects to the aerial images, respectively, the photographing position information of one flying object indicating a position of the one flying object at a time the corresponding aerial image is captured, and the inclination information of the one flying object indicating an inclination of the imaging device of the one flying object at the time the corresponding aerial image is captured; and
storing the plurality of aerial images in a storage device of an image server.

11. An image display system comprising:
a processor; and
a memory storing a computer program that, when executed by the processor, causes the processor to:
acquire an aerial image captured by an imaging device of a flying object during flight of the flying object;
obtain a first image based on the aerial image;
determine an image position of the flying object in the first image, the image position including a horizontal image position, in a horizontal direction of the first image, determined by an inclination of the imaging device, a viewing angle of the image device, and a length of the first image along the horizontal direction;
acquire image position information of the flying object corresponding to the image position in the first image;
superimpose, at the image position in the first image, related information of the flying object onto the first image to generate a second image, including superimposing, at the image position in the first image, an image of the flying object onto the first image; and
control display of the second image indicative of a location of the flying object and the related information of the flying object.

12. The system of claim 11, wherein the related information of the flying object includes orientation information of the flying object.

13. The system of claim 11, wherein the related information of the flying object includes photographing direction information of the imaging device of the flying object.

14. The system of claim 11, wherein the related information of the flying object includes flight direction information of the flying object.

15. The system of claim 11, wherein the computer program further causes the processor to:
acquire inclination information of the imaging device of the flying object with respect to a direction of gravity; and
acquire the image position information based on the inclination information indicative of an inclination of the imaging device.

16. The system of claim 11, wherein the computer program further causes the processor to:
add photographing position information of the flying object and inclination information of the imaging device of the flying object to the aerial image, the photographing position information indicating a position of the flying object at a time the aerial image is captured, and the inclination information indicating an inclination of the imaging device at the time the aerial image is captured; and
store the aerial image into a storage device.

17. The system of claim 11, wherein:
the flying object is one of a plurality of flying objects;
the computer program further causes the processor to:
acquire image position information of each of the plurality of flying objects in the first image; and superimpose respective information of the plurality of flying objects on respective image positions of the plurality of flying objects in the first image to generate the second image.

18. The system of claim 17, wherein the computer program further causes the processor to:
acquire the aerial image captured by an imaging device of one of the plurality of flying objects; and
acquire the image position information of each of the plurality of flying objects in the first image based on relative position information of the plurality of flying objects.

19. The system of claim 17, wherein the computer program further causes the processor to:
acquire position information of each of the flying objects; and
acquire the image position information of each of the flying objects in the first image based on the position information of the each of the flying objects.

20. The system of claim 11, further comprising:
a display device configured to display the second image.

* * * * *